（12） United States Patent
Kawamoto

(10) Patent No.: US 9,405,014 B2
(45) Date of Patent: Aug. 2, 2016

(54) METHOD OF CONTROLLING ELECTRONIC APPARATUS AND ELECTRONIC APPARATUS

(71) Applicant: Seiko Epson Corporation, Tokyo (JP)

(72) Inventor: Tomoya Kawamoto, Shiojiri (JP)

(73) Assignee: Seiko Epson Corporation (JP)

( * ) Notice: Subject to any disclaimer, the term of this patent is extended or adjusted under 35 U.S.C. 154(b) by 410 days.

(21) Appl. No.: 14/103,930

(22) Filed: Dec. 12, 2013

(65) Prior Publication Data

US 2014/0172355 A1 Jun. 19, 2014

(30) Foreign Application Priority Data

Dec. 14, 2012 (JP) ................................ 2012-273282

(51) Int. Cl.
*G01C 9/00* (2006.01)
*G01S 19/38* (2010.01)
*G01S 19/14* (2010.01)

(52) U.S. Cl.
CPC . *G01S 19/38* (2013.01); *G01S 19/14* (2013.01)

(58) Field of Classification Search
CPC ......... G01S 19/47; G01S 19/38; G01S 19/14; G01C 23/00; G01C 21/12; G01C 21/3423; G01C 21/00
See application file for complete search history.

(56) References Cited

U.S. PATENT DOCUMENTS

| 7,245,254 B1 * | 7/2007 | Vogt .................. A63B 69/0028 342/357.57 |
| 8,085,197 B2 * | 12/2011 | Anand .................... G01S 19/14 342/357.77 |
| 8,862,427 B2 * | 10/2014 | Sakuraoka ......... G01C 21/3423 701/19 |
| 2011/0282620 A1 | 11/2011 | Sakuraoka |
| 2012/0123735 A1 | 5/2012 | Kimishima |

FOREIGN PATENT DOCUMENTS

| JP | 2011-257374 A | 12/2011 |
| JP | 2012-107992 A | 6/2012 |

* cited by examiner

*Primary Examiner* — An Do
(74) *Attorney, Agent, or Firm* — Harness, Dickey & Pierce, P.L.C.

(57) ABSTRACT

Correlation calculation is performed on a received signal of a GPS satellite signal as a positioning signal based on a given predicted frequency. Then, an erroneous frequency of the predicted frequency is estimated using carrier phase of the GPS satellite signal based on a result of the correlation calculation. Then, whether or not the erroneous frequency satisfies a predetermined allowable condition is determined, and whether or not an electronic apparatus is in a non-translational movement state in which the electronic apparatus moves while changing the location thereof with respect to a body of the user is determined.

6 Claims, 16 Drawing Sheets

| TIME | DETERMINATION PERIOD No. | TRANSLATIONAL MOVEMENT/NON-TRANSLATIONAL MOVEMENT | RATE OF SATELLITES NOT SATISFYING ALLOWABLE CONDITION | |
|---|---|---|---|---|
| | | | RAW VALUE | FILTERED VALUE |
| t1 | H1 | NON-TRANSLATIONAL MOVEMENT | p11 | p12 |
| t2 | H2 | NON-TRANSLATIONAL MOVEMENT | p21 | p22 |
| t3 | H3 | TRANSLATIONAL MOVEMENT | p31 | p32 |
| ... | ... | ... | ... | ... |

NON-TRANSLATIONAL MOVEMENT STATE DETERMINATION DATA

| ACQUISITION SATELLITE No. | SV2 | | | | | |
|---|---|---|---|---|---|---|
| DETERMINATION PERIOD No. | UNIT PERIOD No. | ERRONEOUS FREQUENCY | BEYOND ALLOWABLE RANGE FLAG | COUNTER VALUE | MEASUREMENT RELIABILITY |
| H1 | T1 | Δf1 | OFF | | |
| | T2 | Δf2 | OFF | 5 | 3 |
| | T3 | Δf3 | ON | | |
| | ... | ... | ... | | |
| | T50 | Δf50 | OFF | | |
| ... | ... | ... | ... | ... | ... |

2951, 2952, 2953, 2954, 2955, 2956, 2957

METHOD OF CONTROLLING ELECTRONIC APPARATUS AND ELECTRONIC APPARATUS

This application claims priority to Japanese Patent Application No. 2012-273282, filed Dec. 14, 2012, the entirety of which is hereby incorporated by reference.

BACKGROUND

1. Technical Field

The present invention relates to a method of controlling an electronic apparatus that is carried by a user, receives positioning signals, and calculates a location etc.

2. Related Art

As an electronic apparatus that is carried by a user, receives positioning signals, and calculates a location, various kinds of electronic apparatuses such as mobile phones (including smartphones), portable car navigation systems, PDAs (Personal Digital Assistants), and runners watches have been known. In the electronic apparatus, positioning signals are received and locations are calculated, and various kinds of display based on the calculated locations are performed.

As technologies for the electronic apparatus, technologies of determining a movement state have been disclosed in JP-A-2011-257374 and JP-A-2012-107992.

In the technologies disclosed in JP-A-2011-257374 and JP-A-2012-107992, the movement state of an electronic apparatus (user) is determined based on detection results of an acceleration sensor. Accordingly, in the technologies, it is essential to provide the acceleration sensor in the electronic apparatus.

Further, for example, in consideration of an acceleration sensor by MEMS (Micro Electro Mechanical Systems) applying the microfabrication technology of semiconductors, the MEMS sensor is sensitive to impact, vibration, temperature change, etc., and its detection accuracy largely changes due to various disturbance factors. Accordingly, when the movement state of the electronic apparatus is determined based on the detection result of the acceleration sensor, the determination is not always correct.

SUMMARY

An advantage of some aspects of the invention is to propose a new method for determining a movement state of an electronic apparatus that is carried by a user, receives positioning signals, and calculates a location, especially, whether or not the electronic apparatus is in a movement state (hereinafter, referred to as "non-translational movement state") in which the electronic apparatus moves while changing its location relative to a body (torso) of the user.

A first aspect of the invention is directed to a method of controlling an electronic apparatus that is carried by a user, receives a positioning signal, and calculates a location, including performing correlation calculation on the received positioning signal based on a given predicted frequency, estimating an erroneous frequency of the predicted frequency using carrier phase of the positioning signal based on a result of the correlation calculation, determining whether or not the erroneous frequency satisfies a predetermined allowable condition, determining whether or not the electronic apparatus is in a non-translational movement state in which the electronic apparatus moves while changing the location thereof relative to a body of the user, and changing a method of controlling location calculation or changing display control if the electronic apparatus is determined to be in the non-translational movement state.

As another aspect of the invention, the first aspect may be configured as an electronic apparatus that is carried by a user, receives a positioning signal, and calculates a location, including a correlation unit that performs correlation calculation on the received positioning signal based on a given predicted frequency, an estimation unit that estimates an erroneous frequency of the predicted frequency using carrier phase of the positioning signal based on a result of the correlation calculation, a determination unit that determines whether or not the erroneous frequency satisfies a predetermined allowable condition, a non-translational movement state determination unit that determines whether or not the electronic apparatus is in a non-translational movement state in which the electronic apparatus moves while changing the location thereof relative to a body of the user using a result of the determination, and a control changing unit that changes a method of controlling location calculation or changes display control if positive determination is made by the non-translational movement state determination unit.

According to the first aspect and the like of the invention, the correlation calculation is performed on the received positioning signal based on the given predicted frequency. Then, the erroneous frequency of the predicted frequency is estimated using the carrier phase of the positioning signal based on the result of the correlation calculation. The larger the erroneous frequency of the predicted frequency, the more incorrectly the frequency was predicted. For example, in the case where the user moves with the electronic apparatus in the hand or moves while swinging the arm wearing the electronic apparatus, the velocity of the electronic apparatus periodically changes in response to the swinging of the arm of the user. When the velocity of the electronic apparatus changes, the Doppler frequency when receiving the positioning signal changes. However, in a typical electronic apparatus that receives the positioning signal and performs location calculation, its design may not follow the frequency change at the frequency corresponding to swinging of the arm, and the predicted frequency differs from the actual frequency and the erroneous frequency of the predicted frequency tends to be larger.

Accordingly, whether or not the erroneous frequency satisfies the predetermined allowable condition is determined, and whether or not the electronic apparatus is in the non-translational movement state in which the apparatus moves while changing the location thereof relative to the body of the user is determined using the result of that determination. Thereby, the electronic apparatus in the non-translational movement state may be appropriately detected. Further, the method of controlling location calculation is changed or display control is changed if the electronic apparatus is in the non-translational movement state, and thereby, the control of the location calculation or display control suitable for the movement state of the electronic apparatus may be realized.

As a second aspect of the invention, the determination as to whether or not the electronic apparatus is in the non-translational movement state in the control method according to the first aspect of the invention may be to determine whether or not the electronic apparatus is in the non-translational movement state based on at least one index value of a number of times of occurrence, a frequency of occurrence, and a rate of occurrence of determination that the erroneous frequency does not satisfy the allowable condition.

According to the second aspect of the invention, whether or not the electronic apparatus is in the non-translational movement state is determined based on at least one index value of the number of times of occurrence, the frequency of occurrence, and the rate of occurrence of determination that the erroneous frequency does not satisfy the allowable condition, and thereby, whether or not the electronic apparatus is in the non-translational movement state may be precisely determined.

As a third aspect of the invention, in the control method according to the first or the second aspect of the invention, the positioning signal may be a signal from each of a plurality of satellites, selecting a satellite used for the non-translational movement state determination among the plurality of satellites may be further included, and the determination as to whether or not the electronic apparatus is in the non-translational movement state may include determining whether or not the electronic apparatus is in the non-translational movement state using a determination result as to whether or not the erroneous frequency relating to the selected satellite satisfies the allowable condition.

According to the third aspect of the invention, the satellite used for the non-translational movement state determination is selected among the plurality of satellites. Then, whether or not the electronic apparatus is in the non-translational movement state is determined using the determination result as to whether or not the erroneous frequency relating to the selected satellite satisfies the allowable condition. For example, the correctness of the non-translational movement state determination may be improved using the satellite with the high quality of received positioning signal for the non-translational movement state determination.

As a fourth aspect of the invention, in the control method according to the first aspect of the invention, the positioning signal is a signal from each of a plurality of satellites, and the determination as to whether or not the electronic apparatus is in the non-translational movement state may be to determine whether or not the electronic apparatus is in the non-translational movement state based on at least one index value of a number, a frequency, and a rate of satellites for which the determination results do not satisfy the allowable condition among the plurality of satellites.

According to the fourth aspect of the invention, whether or not the electronic apparatus is in the non-translational movement state is determined based on at least one index value of the number, the frequency, and the rate of satellites for which the determination results do not satisfy the allowable condition among the plurality of satellites. Thereby, whether or not the electronic apparatus is in the non-translational movement state may be appropriately determined.

As a fifth aspect of the invention, in the control method according to any one of the second to fourth aspects of the invention, the determination as to whether or not the electronic apparatus is in the non-translational movement state may include performing filter processing of removing an unexpected value of the index value based on temporal change of the index value, and determining whether or not the electronic apparatus is in the non-translational movement state based on the filter-processed index value.

According to the fifth aspect of the invention, the filter processing of removing the unexpected value of the index value is performed based on the temporal change of the index value. Then, whether or not the electronic apparatus is in the non-translational movement state is determined based on the filter-processed index value. Accordingly, the accuracy of the non-translational movement state determination may be improved.

BRIEF DESCRIPTION OF THE DRAWINGS

The invention will be described with reference to the accompanying drawings, wherein like numbers reference like elements.

FIG. 9 shows an example of a data configuration of log data.

FIG. 11 shows an example of a data configuration of non-translational movement state determination data.

DESCRIPTION OF EXEMPLARY EMBODIMENTS

Figure 1A:
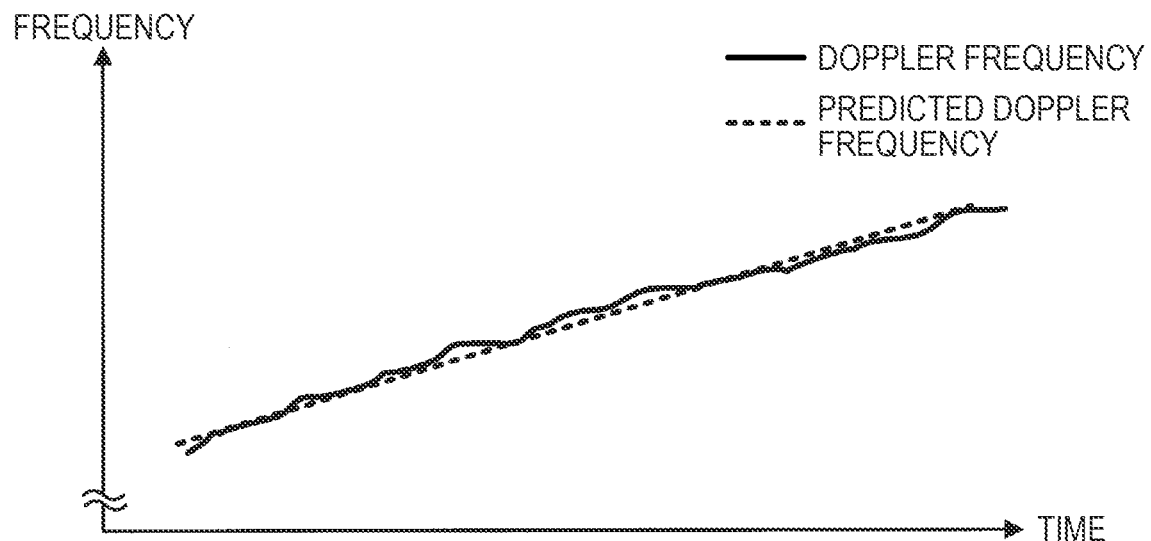
FIG. 1A is a schematic diagram of a relationship between Doppler frequency and predicted Doppler frequency at the time of stoppage.

As below, an example of preferred embodiments to which the invention is applied will be explained. The embodiment is an embodiment to which GPS (Global Positioning System) is applied as a satellite positioning system. Note that, obviously, the forms to which the invention may be applied are not limited to the embodiment to be explained.

1. Principle 1-1. Method of Determining Non-Translational Movement State

First, a method of determining a non-translational movement state in the embodiment will be explained. The method of determining a non-translational movement state in the embodiment may be applied to an arbitrary electronic apparatus as long as it is an electronic apparatus that is carried by a user, receives positioning signals, and calculates a location. For example, an electronic apparatus such as a mobile phone (including smartphone), a portable navigation system, a PDA, and a runners watch corresponds to the electronic apparatus.

A GPS satellite as a kind of positioning satellite transmits navigation messages including satellite orbit data such as Almanac or Ephemeris on GPS satellite signals as a kind of positioning signals. The GPS satellite signal is a communication signal at 1.57542 [GHz] modulated using a C/A (Coarse and Acquisition) code as a kind of spread signal according to the CDMA (Code Division Multiple Access) system known as a spectrum spread system. The C/A code is a pseudo random noise code at the repetition period of 1 ms with a code length of 1023 chips as one PN frame, and a unique code to each GPS satellite.

The frequency at which the GPS satellite transmits the GPS satellite signal (prescribed carrier frequency) is prescribed to be 1.57542 [GHz], however, due to the Doppler generated with the movements of the GPS satellite and a GPS receiver or the like, the frequency at which the GPS receiver receives the GPS satellite signal is not necessarily equal to the prescribed carrier frequency. Accordingly, the GPS receiver executes correlation calculation between the received signal and the replica code as a pseudo C/A code generated within the receiver with respect to the frequency direction and the phase direction and acquires the GPS satellite signal.

The correlation calculation in the frequency direction refers to calculation (so-called frequency search) for specifying the frequency of the received carrier signal as a signal of received carrier (hereinafter, referred to as "reception frequency"). Further, the correlation calculation in the phase direction refers to calculation (so-called phase search) for specifying the phase of the received C/A code as the C/A code contained in the received signal (hereinafter, referred to as "code phase").

Specifically, the GPS receiver multiplies the received carrier signal by a carrier removal signal as a signal at the carrier frequency for removing carrier from the received carrier signal (hereinafter, referred to as "carrier wipe off"). Then, the receiver performs correlation calculation between the received code signal obtained as the multiplication result and the replica code and detects the peak of the correlation value obtained as the calculation result, and thereby, specifies the reception frequency and the code phase. This is acquisition of the GPS satellite signal.

When acquiring the GPS satellite signal, the GPS receiver tracks the acquired GPS satellite signal. The tracking of the GPS satellite signal may be realized by a tracking locked loop such as a delay locked loop DLL for tracking the code phase, a phase locked loop PLL for tracking the carrier phase, or a frequency locked loop FLL for tracking the carrier frequency. In the embodiment, FLL of the locked loops is focused and the case of tracking the carrier frequency using FLL will be explained.

FLL is for controlling an oscillator (e.g., a carrier NCO (Numerical Controlled Oscillator)) that generates a carrier removal signal (also referred to as "carrier replica signal"), and controls the oscillator so that the phase of the received signal and the phase of the carrier removal signal may be the same. FLL is designed to linearly predict the Doppler frequency using a frequency discriminator and a loop filter based on the history of the tracking frequency in the past, for example.

Figure 1B:
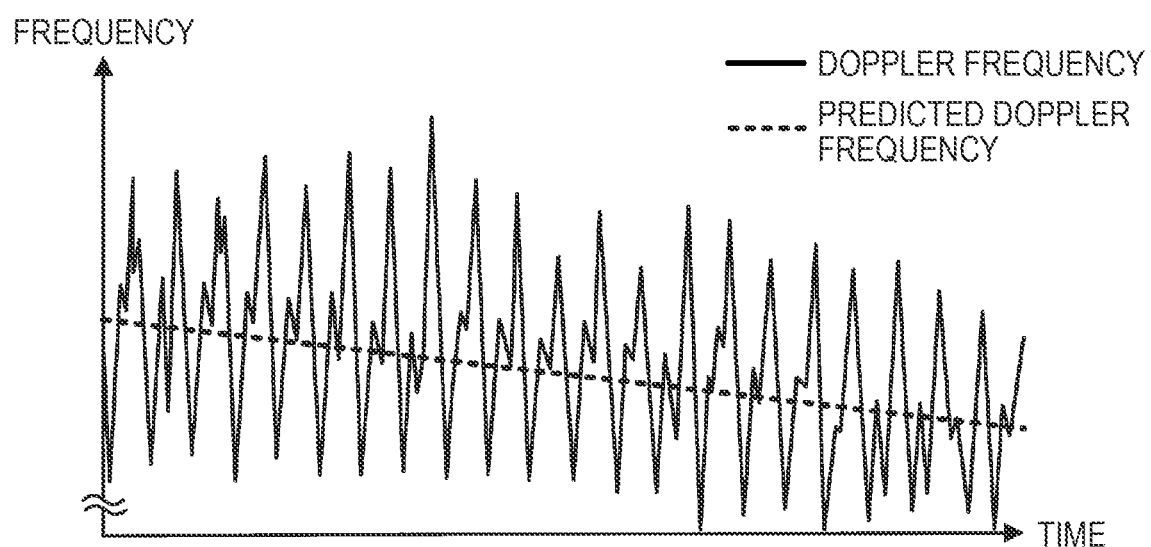
FIG. 1B is a schematic diagram of a relationship between Doppler frequency and predicted Doppler frequency at the time of swinging of an arm.

FIGS. 1A and 1B show temporal change of the actual Doppler frequency and temporal change of Doppler frequency predicted by FLL (hereinafter, referred to as "predicted Doppler frequency"). The actual Doppler frequency is shown by a solid line and the predicted Doppler frequency is shown by a dotted line, respectively. FIG. 1A shows the case where the GPS receiver is stopped. The horizontal axis indicates time and the vertical axis indicates frequency. Here, the GPS satellite moves in a direction closer to the GPS receiver.

It is known from FIG. 1A that, as the GPS satellite moves closer to the GPS receiver, the Doppler frequency changes to increase and the change exhibits a nearly linear tendency. On the other hand, FLL linearly predicts the Doppler frequency, and thus, the predicted Doppler frequency also linearly increases. As a result, the real Doppler frequency and the predicted Doppler frequency are nearly equal. The condition shows that the carrier frequency may be appropriately tracked.

FIG. 1B shows the case where a user wearing the GPS receiver on an arm walks while swinging the arm. The angle of the diagram is the same as that of FIG. 1A, however, in FIG. 1B, the GPS satellite moves in a direction farther from the GPS receiver.

It is known from FIG. 1B that, as the GPS satellite moves farther from the GPS receiver, the predicted Doppler frequency changes to decrease. The large difference from FIG. 1A is that the real Doppler frequency largely vibrates in a period corresponding to the swinging of the arm.

FLL obtains the predicted Doppler frequency after averaging the Doppler frequencies in the past using a filter, and thus, does not follow the periodic change of the Doppler frequency by the swinging of the arm, but linearly predicts the Doppler frequency. That is, there is a divergence between the predicted Doppler frequency and the real Doppler frequency and tracking of the carrier frequency is not appropriately performed.

This is because the user swings the arm and the movement velocity of the GPS receiver changes with a period of about several tens of milliseconds to several seconds. As a result, the relative velocity vector of the GPS satellite and the GPS receiver periodically changes and accordingly the Doppler frequency changes, and thereby, a divergence is generated between the predicted Doppler frequency and the real Doppler frequency.

The inventors of the invention have focused attention on the phenomenon and invented a technology of using the phenomenon for non-translational movement state determination of an electronic apparatus. As below, the technology will be explained.

Figure 2:
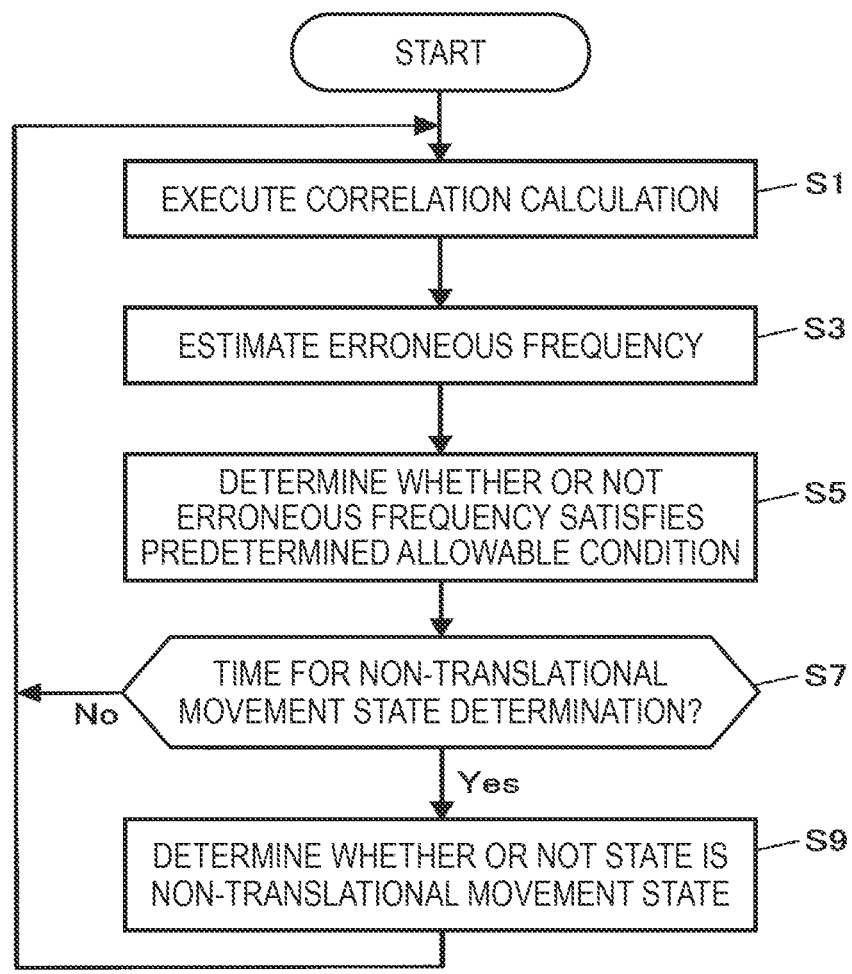
FIG. 2 is a flowchart showing a procedure of non-translational movement state determination.

FIG. 2 is a flowchart showing a procedure of the non-translational movement state determination of an electronic apparatus.

First, correlation calculation between the received signal and the replica code of the GPS satellite signal is performed (step S1). Then, an erroneous frequency is estimated based on the result of the correlation calculation (step S3). Then, whether or not the erroneous frequency satisfies a predetermined allowable condition is determined (step S5).

Then, whether or not the time is the time for non-translational movement state determination (step S7). If the determination that the time is not the time for non-translational movement state determination has been made (step S7; No), the process returns to step S1. Further, if the determination that the time is the time for non-translational movement state determination has been made (step S7; Yes), whether or not the state is the non-translational movement state is determined (step S9). Then, the process returns to step S1.

The general flow of the non-translational movement state determination is as described above. Next, processing at the respective steps of the processing flow will be explained in detail.

1-1-1. Correlation Calculation (Step S1)

In the embodiment, the explanation will be made with each period of 20 milliseconds as a unit period. The unit period corresponds to the bit length of the navigation message carried on the GPS satellite signal. In the embodiment, the received signal of the GPS satellite signal is divided at intervals of 20 milliseconds, and the correlation calculation with the replica code is performed with each period of 20 milliseconds as "unit period" with respect to the received signal relating to each unit period. Further, the time of 20 milliseconds defining the unit period will be explained as "unit time".

First, the received signal is IQ-separated. A known method in the related art is applied to the IQ-separation method. Then, the correlation calculation with the replica code is performed on reception data formed by digitalization of the IQ-separated received signal. Thereby, an I-phase correlation value as a correlation value of I-phase and a Q-phase correlation value as a correlation value of Q-phase are obtained. Note that the I-phase shows the in-phase component (real part) of the received signal and the Q-phase shows the orthogonal component (imaginary part) of the received signal. The time when the correlation value is calculated may be set to the time at predetermined time intervals (e.g., one millisecond), for example.

1-1-2. Estimation of Erroneous Frequency (Step S3)

Figure 3:
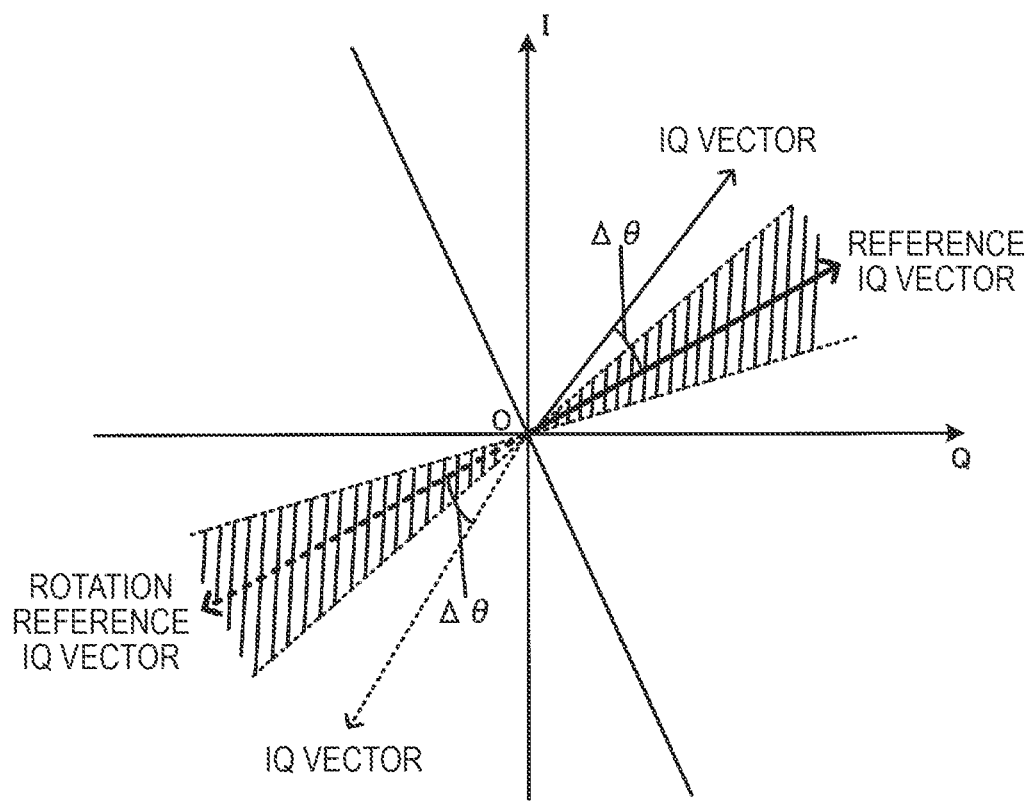
FIG. 3 is an explanatory diagram of a method of estimating an erroneous frequency.

FIG. 3 is an explanatory diagram of a method of estimating the erroneous frequency.

With respect to the respective I-phase correlation value and the Q-phase correlation value obtained by the correlation calculation, the correlation values for the received data in the respective unit periods are integrated for the unit periods (20 milliseconds), and I-phase correlation integrated values "SumI" and Q-phase correlation integrated values "SumQ" are obtained with respect to the respective unit periods. The numbers of the unit periods corresponding to the respective correlation integrated values "n=1, 2, 3, . . . " are expressed with parentheses. For example, the I-phase correlation integrated value and the Q-phase correlation integrated value of the first (n=1) unit period are expressed by "SumI(1)" and "SumQ(1)", respectively.

In the IQ coordinate system, an IQ vector (n) having components of the I-phase correlation integrated value SumI(n) and the Q-phase correlation integrated value SumQ(n) in the nth unit period is used as the reference IQ vector. The phase of the IQ vector shows phase of the received carrier signal (carrier phase). In the embodiment, the reference phase is defined using the carrier phase based on the result of the correlation calculation performed on the reception data relating to the last unit time. Specifically, the carrier phase of the reference IQ vector is used as the reference phase.

Then, an IQ vector (n+1) having components of the I-phase correlation integrated value SumI (n+1) and the Q-phase correlation integrated value SumQ(n+1) in the (n+1)th unit period is drawn on the IQ coordinates. The erroneous frequency from the predicted frequency in the nth unit period is estimated based on the phase difference between the carrier phase of the IQ vector (n+1) and the carrier phase (reference phase) of the reference IQ vector (n). The phase difference may be calculated as an angle $\Delta\theta$ formed by the reference IQ vector (n) and the IQ vector (n+1). The angle $\Delta\theta$ may be calculated with an angle counterclockwise with respect to the reference IQ vector as a positive angle and an angle clockwise as a negative angle, for example.

Then, the angle $\Delta\theta$ is converted to the frequency, and thereby, the erroneous frequency is estimated. The conversion from the phase difference to the frequency may be performed in the following manner, for example. The BPSK modulation of the navigation message is 50 bps (50 Hz), and the phase difference is converted to the erroneous frequency with the frequency change of 50 Hz in correspondence with the phase change of 360°. That is, the phase difference is converted to the erroneous frequency suppose that the frequency change of 50/360 Hz occurs per phase change of 1°.

When the bit value of the navigation message does not change at the boundary between the nth unit period and the (n+1)th unit period, the IQ vector (n+1) should not very largely rotate from the reference IQ vector (n). However, when the bit value of the navigation message changes at the boundary between the nth unit period and the (n+1)th unit period, the IQ vector (n+1) rotated to about 180° in one of positive and negative directions with respect to the reference IQ vector (n) is obtained. This is because the polarity of the correlation value becomes opposite when the bit value of the navigation message changes.

Therefore, when the IQ vector (n+1) is rotated to about 180° in one of positive and negative directions with respect to the reference IQ vector (n), the determination that it is highly possible that the bit value of the navigation message has changed is made, and the erroneous frequency is estimated in consideration of the possibility. Specifically, the rotation reference IQ vector formed by rotating the reference IQ vector (n) to 180° around the origin is considered. Then, the angle $\Delta\theta$ formed by the rotation reference IQ vector and the IQ vector (n+1) is calculated and the erroneous frequency is obtained from the angle $\Delta\theta$.

1-1-3. Determination as to Whether or not Erroneous Frequency Satisfies Allowable Condition (Step 5)

In the embodiment, a condition that the magnitude of the frequency obtained by conversion of the phase difference to the erroneous frequency is equal to or less than a threshold frequency is defined as the allowable condition. According to the experiments made by the inventors of the invention, it is known that, when a user wearing an electronic apparatus walks or runs while swinging the arm, frequency fluctuations over 4 Hz are steadily generated. Accordingly, the threshold frequency for defining the allowable condition is defined as a predetermined frequency equal to or less than 4 Hz.

For example, the threshold frequency is set to 3 Hz less than 4 Hz by 1 Hz, and whether or not the erroneous frequency satisfies the allowable condition is determined. That is, when the erroneous frequency is equal to or less than 3 Hz, the determination that the allowable condition is satisfied is made, and, when the erroneous frequency is more than 3 Hz, the determination that the allowable condition is not satisfied is made.

Note that, here, the explanation has been made with the threshold frequency of 3 Hz, however, obviously, the threshold frequency is not limited to that. The predetermined frequency equal to or less than 4 Hz may be defined as the threshold frequency.

Referring to FIG. 3 again, the predetermined angle range around the reference IQ vector (the hatched range in the drawing) is the angle range corresponding to the allowable range of the erroneous frequency. In other words, the range is the allowable range of the phase difference. That is, when the IQ vector is contained in the hatched range in FIG. 3, the erroneous frequency satisfies the allowable condition. Therefore, whether or not the erroneous frequency satisfies the allowable condition may be determined by threshold determination with respect to the phase difference in place of the threshold determination with respect to the erroneous frequency.

1-1-4. Determination as to Whether or not Time is Time for Non-Translational Movement State Determination (Step S7)

In the embodiment, the time for non-translational movement state determination is each time when a predetermined time defined to be longer than the unit time elapses. The unit time is 20 milliseconds, and it is necessary that the intervals of determination times are longer than the time. For example, the interval may be set to one second and, obviously, shorter or longer than one second. Further, a user may input a command of the time for non-translational movement state determination. As below, the period defined by the interval of determination times is referred to as "determination period".

1-1-5. Determination as to Whether or not State is Non-Translational Movement State (Step 9)

(A) Method Using GPS Satellite Signals Transmitted from One GPS Satellite

In the determination as to whether or not the state is the non-translational movement state, whether or not an electronic apparatus is in the non-translational movement state is determined based on an index value of one of the number of times of occurrence, the frequency of occurrence, and the rate of occurrence of the determination that the erroneous frequency does not satisfy the allowable condition.

The processing when one acquisition satellite is focused is exemplified. With respect to one acquisition satellite, the total value of the number of times when the erroneous frequency does not satisfy the allowable condition is calculated as the number of times of occurrence of the determination that the erroneous frequency does not satisfy the allowable condition based on the determination result of the allowable condition with respect to each unit period contained in the determination period. Then, the number of times of occurrence is compared to a predetermined threshold number of times and, if the number of times of occurrence is equal to or more than (or over) the threshold number of times, the determination that the electronic apparatus is in the non-translational movement state is made. On the other hand, if the number of times of occurrence is less than (or equal to or less than) the threshold number of times, the determination that the electronic apparatus is in the translational movement state is made.

Figure 4A:
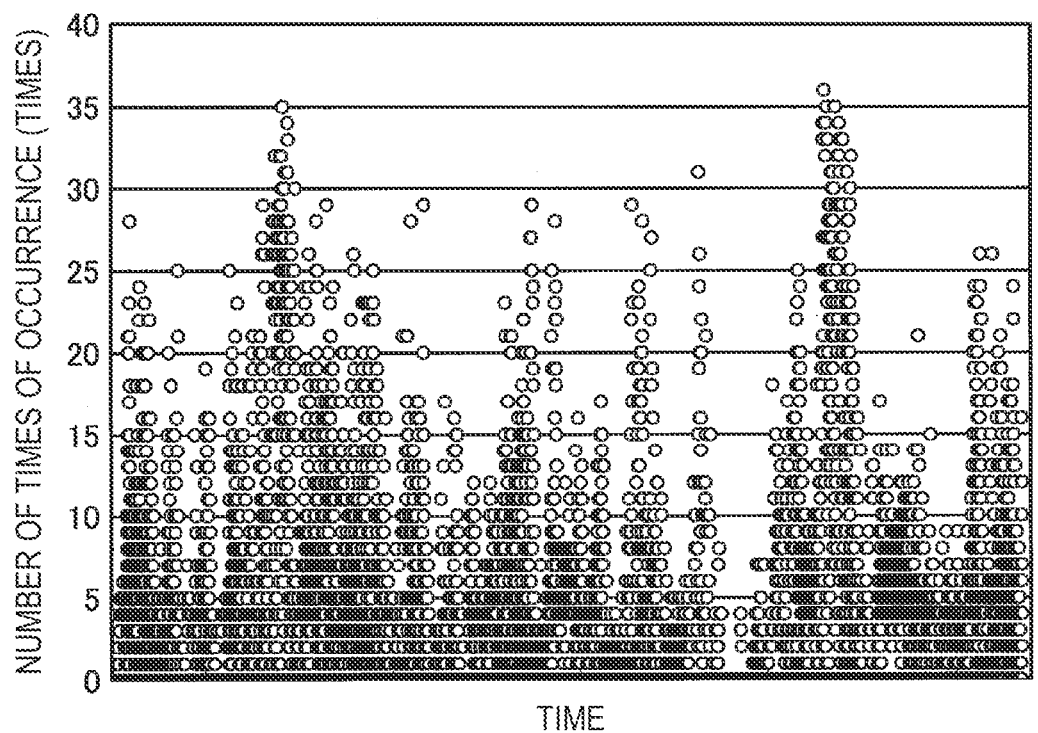
FIG. 4A shows an example of an experimental result in a translational movement state.
Figure 4B:
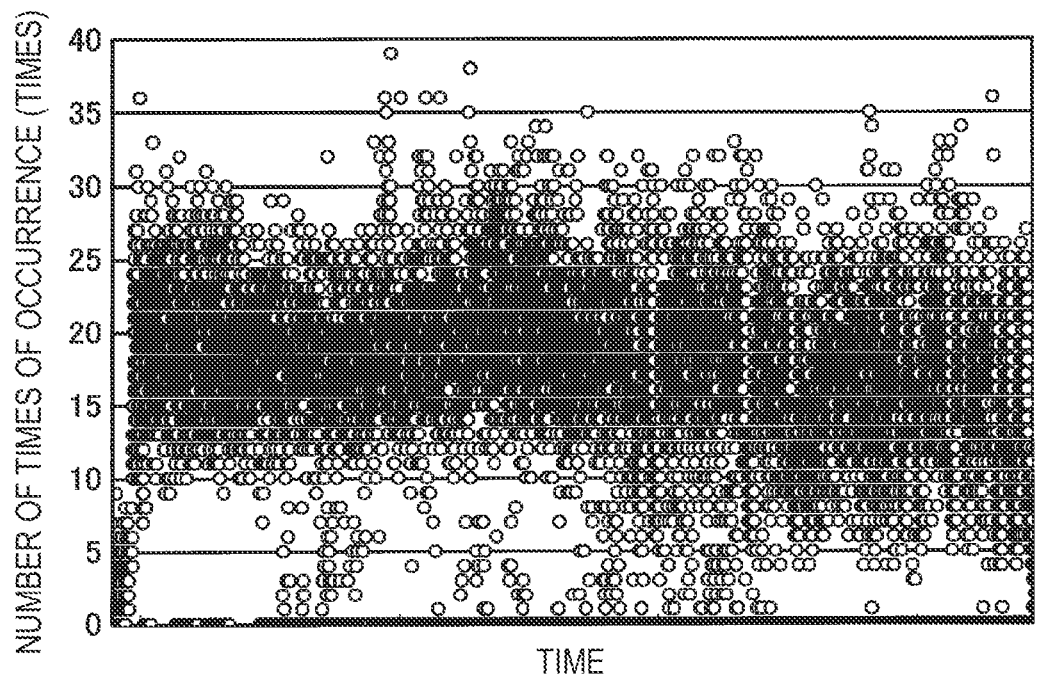
FIG. 4B shows an example of an experimental result in a non-translational movement state.

FIGS. 4A and 4B show examples of experimental results in which the numbers of times of occurrence of determination that the erroneous frequency does not satisfy the allowable condition within a predetermined period are plotted with respect to a plurality of acquisition satellites. FIG. 4A shows the example of the result of the experiment to check the numbers of times of occurrence in the case where an electronic apparatus is fixed to an automobile and translationally moved, and FIG. 4B shows the example of the result of the experiment to check the numbers of times of occurrence in the case where an electronic apparatus is worn on an arm of a user and non-translationally moved. In the respective drawings, the horizontal axis indicates time and the vertical axis indicates number of times of occurrence. The plots corresponding to the same time on the time axis show the numbers of times of occurrence of the respective acquisition satellites at the time.

First, it is known from FIG. 4A that the plots of the numbers of times of occurrence are entirely concentrated near zero to ten times. This means that, when the electronic apparatus is in the transitional movement state, the rate at which the erroneous frequency satisfies the allowable condition is higher.

Then, it is known from FIG. 4B that the plots of the numbers of times of occurrence are entirely shifted upward compared to those in FIG. 4A. It is also known that, compared to the part from zero to ten times, the plots of the numbers of times of occurrence are concentrated near 15 to 25 times. This means that, when the electronic apparatus is in the non-transitional movement state, the rate at which the erroneous frequency satisfies the allowable condition is lower.

From these experimental results, it is conceivable that whether or not the state is the non-transitional movement state may be determined based on the number of times of determination that the erroneous frequency relating to a certain acquisition satellite does not satisfy the allowable condition.

Note that, not the number of times of determination that the allowable condition is not satisfied, but the frequency or the rate relating to the positive and negative determinations may be used. In this case, the frequency of occurrence and the rate of occurrence of the determination that the erroneous frequency does not satisfy the allowable condition within the determination period may be calculated based on the number of times at which the allowable condition is satisfied and the number of times at which the allowable condition is not satisfied within the predetermined period. Then, the calculated frequency of occurrence or rate of occurrence is used as the index value and, for example, threshold determination is performed, and thereby, whether or not the electronic apparatus is in the non-translational movement state may be determined.

(B) Method of Using GPS Satellite Signals Transmitted from GPS Satellites

In the above described method, the non-translational movement state determination has been performed using the GPS satellite signals transmitted from one GPS satellite, however, the non-translational movement state determination may be performed using the GPS satellite signals transmitted from a plurality of GPS satellites.

It is known from the above described experimental results in FIGS. 4A and 4B, even the number of times of occurrence at the same time varies from one GPS satellite to another. If the number of times of occurrence is counted by the same method, there are satellites having the larger and smaller number of times of occurrence. Accordingly, a satellite used for non-translational movement state determination (hereinafter, referred to as "determination-use satellite") is selected among the plurality of GPS satellites.

As a method of selecting the determination-use satellite, selection of a satellite having good signal quality of the GPS satellite signals of those received from the respective satellites is considered. The signal quality of the GPS satellite signals may be determined using various known methods in related art. For example, reliability of measurement information (hereinafter, referred to as "measurement reliability") may be used as an index value of signal quality.

The measurement information is various quantities relating to the received GPS satellite signals including the above described code phase and Doppler frequency, for example. As criteria for determination of the measurement reliability, information such as intensity of received signals of the GPS satellite signals (signal intensity) and elevation angle of the acquisition satellite may be used. The reliability of the measurement information acquired based on the acquisition satellite with the higher signal intensity and the acquisition satellite with the larger elevation angle may be judged to be higher.

Accordingly, as one method, all acquisition satellites are sorted according to whether or not the measurement reliability is equal to or more than a certain level. Further, using the rate of satellites with the number of times of determination that the erroneous frequency does not satisfy the allowable condition in the determination period (e.g., one second) over the predetermined threshold number of times among the satellites with the certain level or more of measurement reliability (hereinafter, referred to as "rate of satellites not satisfying allowable condition" as an index value, whether or not the electronic apparatus is in the non-translational movement state is determined.

Figure 5A:
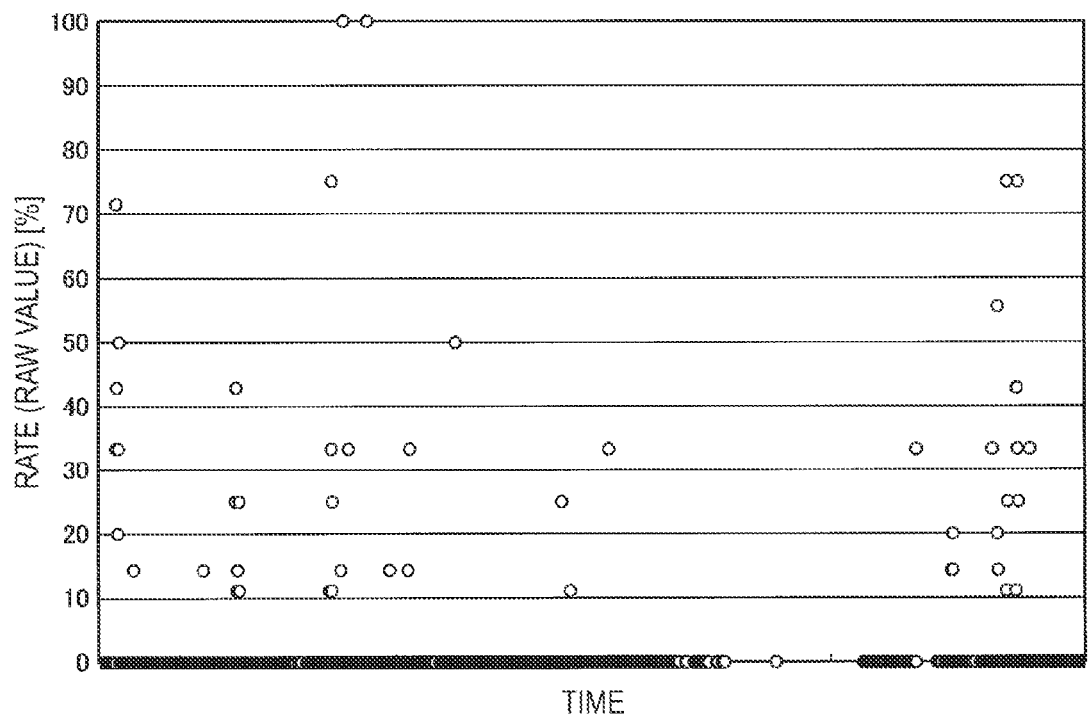
FIG. 5A shows an example of an experimental result in a translational movement state.
Figure 5B:
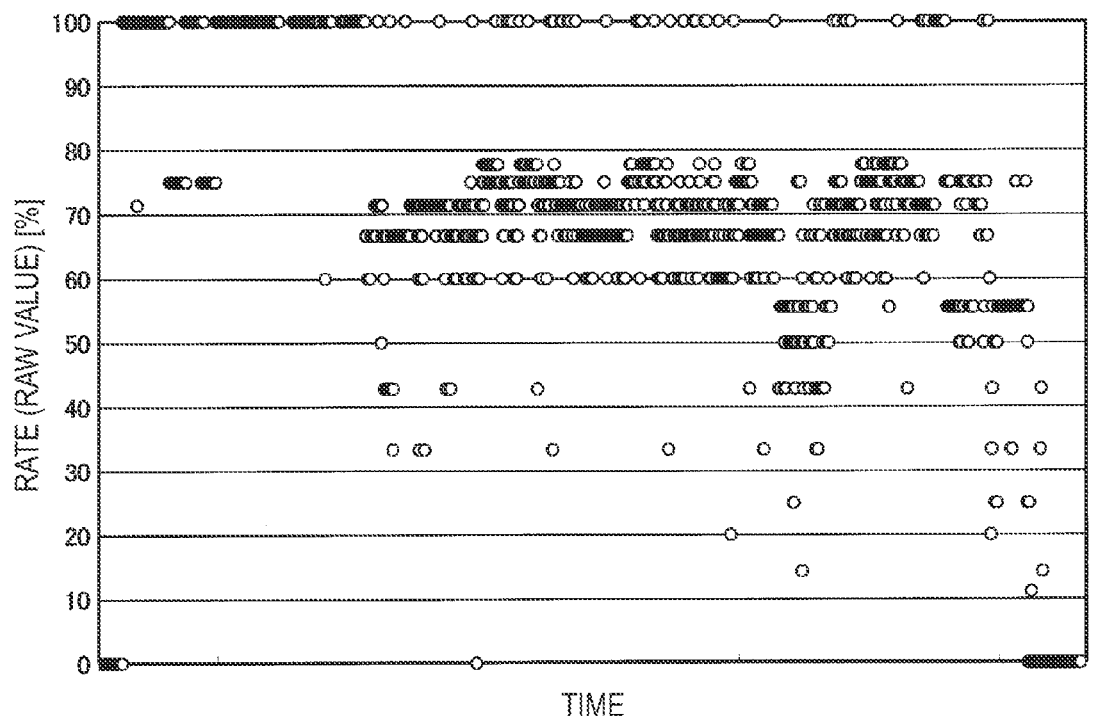
FIG. 5B shows an example of an experimental result in a non-translational movement state.

FIGS. 5A and 5B show examples of experimental results of experiments to check the rate of satellites not satisfying allowable condition. FIG. 5A shows the example of the result of the experiment to check the rate of satellites not satisfying allowable condition in the case where an electronic apparatus is fixed to an automobile and translationally moved, and FIG. 5B shows the example of the result of the experiment to check the rate of satellites not satisfying allowable condition in the case where a user wears an electronic apparatus on the arm while swinging the arm and the electronic apparatus is non-translationally moved. In the respective drawings, the horizontal axis indicates time. The vertical axis indicates rate of satellites not satisfying allowable condition as rate (raw value) [%].

It is known from FIG. 5A that the rate of satellites not satisfying allowable condition is concentrated near 0%. That is, there is a tendency that the satellites with the erroneous frequency satisfying the allowable condition increases.

On the other hand, it is known from FIG. 5B that the rate of satellites not satisfying allowable condition is concentrated near 100% and 60% to 80%. That is, there is a tendency that the satellites with the erroneous frequency not satisfying the allowable condition increases.

From these experimental results, it is conceivable that whether or not the state is the non-transitional movement state may be determined based on the rate of satellites not satisfying allowable condition. For example, if the rate of satellites not satisfying allowable condition is equal to or more than (or over) a predetermined threshold rate (e.g., 50%), the non-transitional movement state is determined and, if the rate is less than (equal to or less than) the predetermined threshold rate, the transitional movement state is determined.

Note that, here, the non-transitional movement state determination has been performed using the rate of the satellites with the erroneous frequency determined not to satisfy the allowable condition as the index value, however, the non-transitional movement state determination may be performed using the number and the frequency of satellites with the erroneous frequency determined not to satisfy the allowable condition as the index value.

(C) Filter Processing

The two methods have been exemplified, however, there is a problem that a reliable value is not always calculated as the index value used for the non-transitional movement state determination. In the reception environment such as the so-called weak field environment or multipath environment, the signal quality of the GPS satellite signals may not sufficiently be secured. In this case, when the index value is calculated using the above described method, a value with high accuracy is not always calculated, but a value unexpectedly changed (unexpected value) may be calculated. If the movement state is determined using the unexpected value, erroneous determination is likely to be performed.

Accordingly, it is effective that filter processing of removing the unexpected values of the index value is performed based on the temporal change of the calculated index value, and whether or not the state is in the non-transitional movement state is determined based on the filter-processed index value. Specifically, the history of the index values calculated with respect to each determination period is saved, and low-pass filter processing of removing the components at the higher frequencies from the temporal change of the index value using the history of the index values is performed. Then, the non-transitional movement state determination is performed using the index value smoothed by the low-pass filter processing.

Figure 6A:
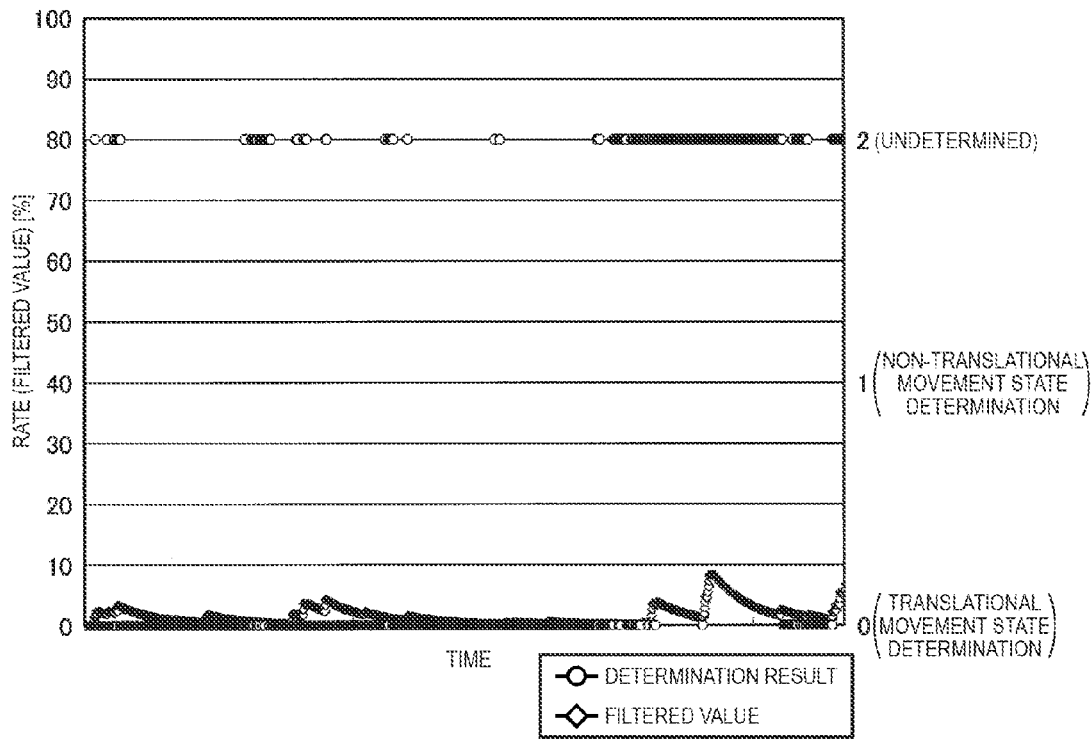
FIG. 6A shows an example of an experimental result in a translational movement state.
Figure 6B:
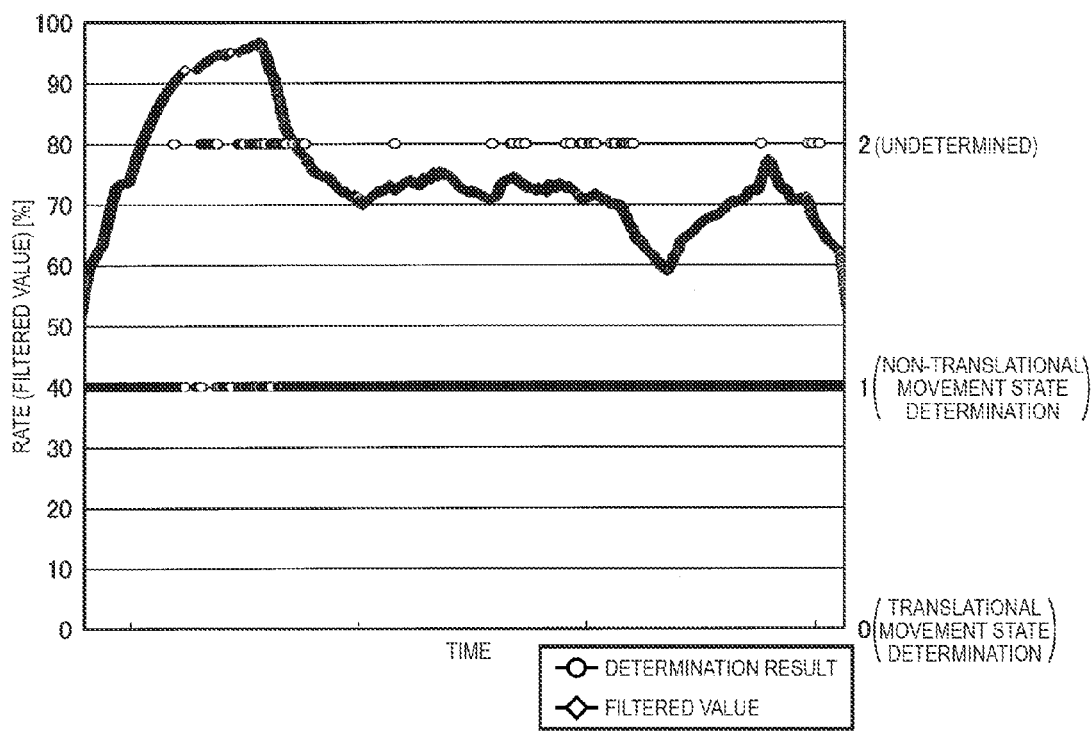
FIG. 6B shows an example of an experimental result in a non-translational movement state.

FIGS. 6A and 6B show example of experimental results obtained by performing filter processing on the rate of satellites not satisfying allowable condition used as the index value in the experiments in FIGS. 5A and 5B and performing the non-transitional movement state determination using the results. Like FIGS. 5A and 5B, FIG. 6A shows the example of the experimental result in the translational movement state, and FIG. 6B shows the example of the experimental result in the non-translational movement state. In the experiments, low-pass filter processing was performed on the rates of satellites not satisfying allowable condition calculated in the experiments in FIGS. 5A and 5B.

In the respective drawings, the horizontal axis indicates time. The left vertical axis indicates value of rate of satellites not satisfying allowable condition after the filter processing (hereinafter, referred to as "filtered value") as rate (filtered value) [%]. This corresponds to the diamond-shaped plots. Further, the right vertical axis indicates determination result of the movement state and this corresponds to circular plots. "0" represents that the determination result is the transitional movement state (transitional movement determination), "1" represents that the determination result is the non-transitional movement state (non-transitional movement determination), and "2" represents that the determination has been impossible (undetermined). Undetermined means that the determination itself has been impossible because the number of acquisition satellites is smaller or the number of acquisition satellites with higher measurement reliability is smaller.

It is known from FIG. 6A that the unexpected values of the rate of satellites not satisfying allowable condition in FIG. 5A are removed in the time axis direction and entirely smoothed filtered values are obtained.

Further, it is known from the determination results of "0" or "2" that the transitional movement is determined or undetermined. All of the results are transitional movement determination except the undetermined cases, and the determination has been correctly performed.

Next, it is known from FIG. 6B that the unexpected values of the rate of satellites not satisfying allowable condition in FIG. 5B are removed in the time axis direction and entirely smoothed filtered values are obtained.

Further, it is known from the final determination results of "1" or "2" that the non-transitional movement is determined or undetermined. All of the results are non-transitional movement determination except the undetermined cases, and the determination has been correctly performed.

1-2. Method of Decoding Navigation Message

In the embodiment, there are not only in the method of determining the non-transitional movement state but also in the method of decoding the navigation message carried on the GPS satellite signal. As below, the method of decoding the navigation message in the embodiment will be explained.

In the embodiment, the time coming in each unit period when the bit value of the navigation message data can change (transition) is defined as "bit transition time". In the embodiment, in the case where the bit transition time is known, but whether or not the bit value changes at the bit transition time is unknown, a method of correctly determining whether or not the bit value changes (i.e., the method of decoding the navigation message) will be explained.

Decoding of the navigation message may be realized using a method of calculating an index value called an IQ inner product value (also referred to as "Dot value"), for example, with respect to each unit period, determining a positive or negative sign of the value, and determining whether or not the bit value of the navigation message changes at the boundary between the unit periods. However, this method is problematic. If whether or not the bit value changes is determined simply based on the IQ inner product value when the frequency at which the GPS receiver tracks the GPS satellite signal (tracking frequency) diverges from the actual reception frequency of the GPS satellite signal to a certain degree or more, erroneous determination occurs with a high probability. Accordingly, in the embodiment, the navigation message is decoded in the following procedure.

Figure 7:
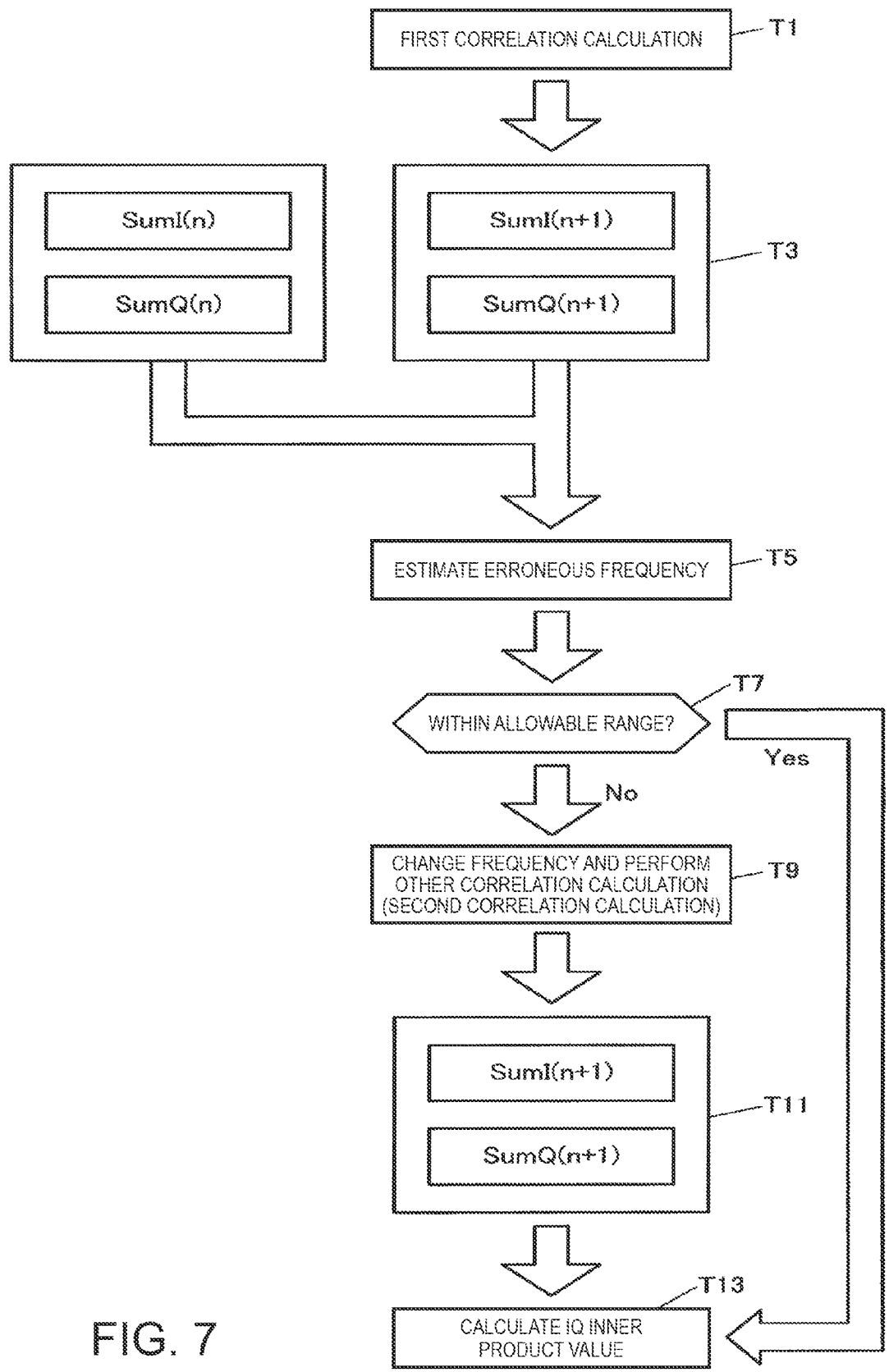
FIG. 7 is an explanatory diagram of a method of decoding a navigation message.

FIG. 7 is a schematic diagram of a flow of decoding of the navigation message in the embodiment. Here, the case where whether or not the bit value of the navigation message changes at the boundary between the nth unit period and the (n+1)th unit period is determined will be explained. Here, the graphical representation and explanation will be made suppose that the I-phase correlation integrated value SumI(n) and the Q-phase correlation integrated value SumQ(n) relating to the nth unit period have been already obtained.

First, first correlation calculation is performed on the reception data of the GPS satellite signals in the (n+1)th unit period based on a first predicted frequency (step T1). The first predicted frequency is a frequency obtained by adding/subtracting the Doppler frequency predicted by FLL to or from the carrier frequency, and a frequency for carrier removal signal generated in a generation unit of the carrier removal signal such as a carrier NCO. The frequency may be referred to as the tracking frequency of the GPS satellite signal.

The result of the first correlation calculation is integrated for 20 milliseconds, and thereby, the I-phase correlation integrated value SumI(n+1) and the Q-phase correlation integrated value SumQ(n+1) relating to the (n+1)th unit period are obtained (step T3).

Then, the erroneous frequency Δf(n+1) of the first predicted frequency in the (n+1)th unit period is estimated using the I-phase correlation integrated value SumI(n) and the Q-phase correlation integrated value SumQ(n) relating to the nth unit period and the I-phase correlation integrated value SumI(n+1) and the Q-phase correlation integrated value SumQ(n+1) relating to the (n+1)th unit period (step T5). The method of estimating the erroneous frequency Δf(n+1) is as explained in FIG. 3.

Then, whether or not the erroneous frequency Δf(n+1) satisfies an allowable condition is determined (step T7). The allowable condition in this case may be the same as the allowable condition used for the non-translational movement state determination, for example. That is, the condition that the magnitude of the frequency obtained by conversion of the phase difference to the erroneous frequency is equal to or less than the threshold frequency may be used as the allowable condition, and the threshold frequency in this case may be defined as a predetermined frequency equal to or less than 4 Hz, for example.

If the determination that the erroneous frequency Δf(n+1) satisfies an allowable condition is made (step T7; Yes), the IQ inner product value is calculated using the I-phase correlation integrated value SumI(n) and the Q-phase correlation integrated value SumQ(n) relating to the nth unit period and the I-phase correlation integrated value SumI(n+1) and the Q-phase correlation integrated value SumQ(n+1) relating to the (n+1)th unit period (step T13), and whether or not the bit value changes is determined based on the positive or negative sign of the IQ inner product value.

Here, the IQ inner product value may be calculated according to the following equation (1).

$$Dot(n|n+1) = PSumI(n) \times PSumI(n+1) + PSumQ(n) \times PSumQ(n+1) \quad (1)$$

If the inner product value Dot(n|n+1) calculated according to the equation (1) is zero or positive (Dot(n|n+1)≥0), the determination that the bit value of the navigation message has not changed at the boundary between the nth unit period and the (n+1)th unit period (bit unchanged) is made. In contrast, if the inner product value Dot(n|n+1) is negative (Dot(n|n+1)<0), the determination that the bit value of the navigation message has changed at the boundary between the nth unit period and the (n+1)th unit period (bit changed) is made.

On the other hand, if the determination that the erroneous frequency Δf(n+1) does not satisfy the allowable condition is made (step T7; No), the first predicted frequency is corrected and a second predicted frequency is calculated. Specifically, the first predicted frequency is corrected to cancel out the erroneous frequency, and the corrected frequency is used as a new tracking frequency (second predicted frequency). In this case, a carrier removal signal of the second predicted frequency (carrier replica signal) is generated by a carrier oscillator. Then, the carrier wipe off is performed by multiplication of the carrier removal signal by the received carrier signal, and correlation calculation using the replica code (second correlation calculation) is performed on the resulting signal (step T9).

Then, the correlation value obtained by the second correlation calculation is integrated for a predetermined time (e.g., 20 milliseconds). That is, the I-phase correlation integrated value SumI(n+1) and the Q-phase correlation integrated value SumQ(n+1) are calculated (step T11). Then, the IQ inner product value is calculated according to the equation (1) using the calculated I-phase correlation integrated value SumI(n+1) and Q-phase correlation integrated value SumQ(n+1) (step T13), and whether or not the bit value of the navigation message changes at the boundary between the nth unit period and the (n+1)th unit period is determined based on its positive or negative sign.

The above described procedure is performed on all unit periods, and whether or not the bit value of the navigation message changes at the boundaries between the respective unit periods is determined. Thereby, decoding of the navigation message carried on the GPS satellite signal may be performed.

2. Working Example

Next, a working example of a smartphone as a compact electronic apparatus will be explained as an example of an electronic apparatus that is carried by a user, receives positioning signals, and calculates the location. Note that, obviously, the working example to which the invention may be applied is not limited to the working example.

2-1. Functional Configuration

Figure 8:
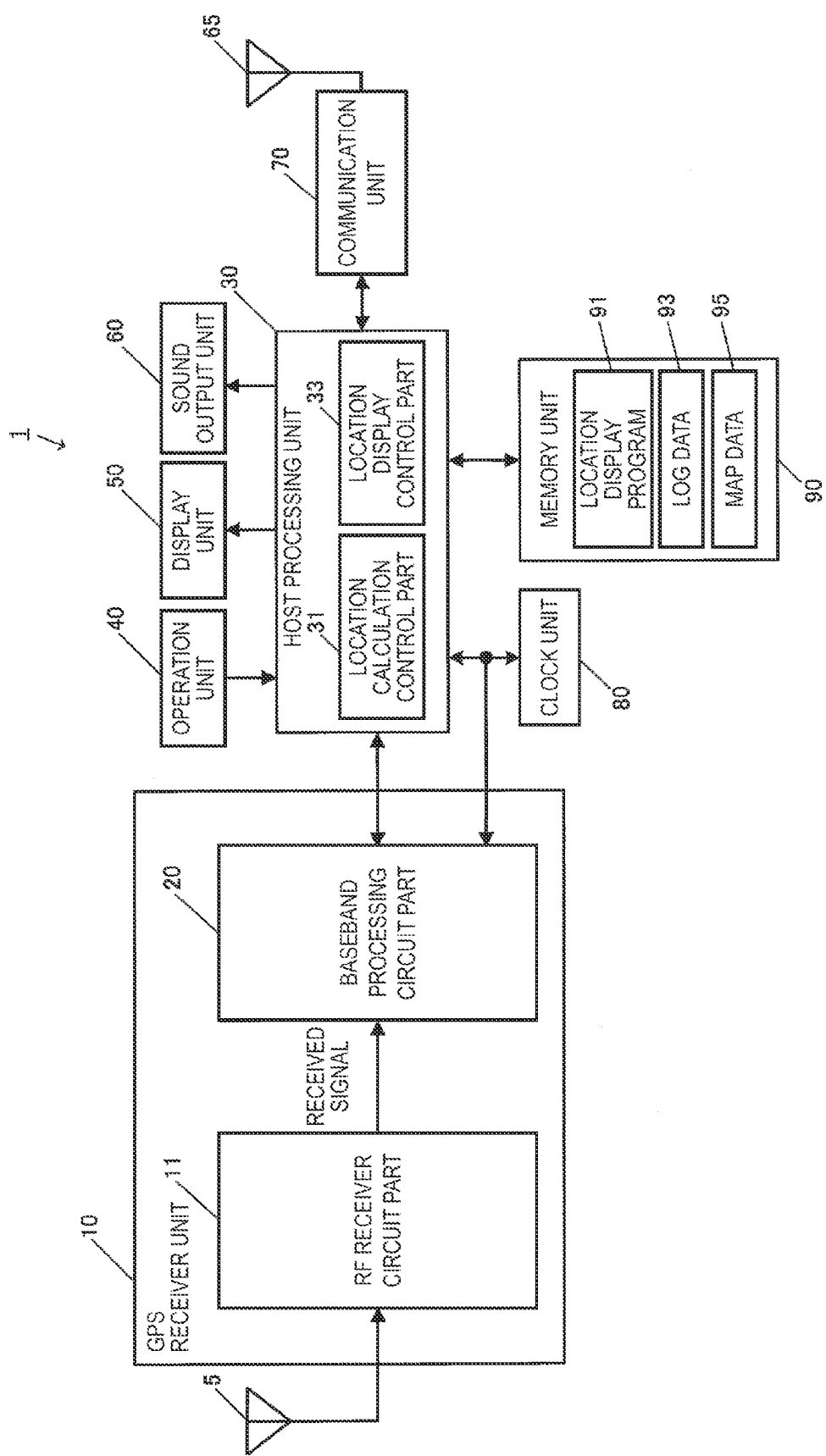
FIG. 8 is a block diagram showing an example of a functional configuration of a smartphone.

FIG. 8 is a block diagram showing an example of a functional configuration of a smartphone 1. The smartphone 1 includes a GPS antenna 5, a GPS receiver unit 10, a host processing unit 30, an operation unit 40, a display unit 50, a sound output unit 60, a communication unit 70, a clock unit 80, and a memory unit 90.

The GPS antenna 5 is an antenna that receives RF (Radio Frequency) signals including the GPS satellite signal transmitted from GPS satellite, and outputs the received signal to the GPS receiver unit 10.

The GPS receiver unit 10 is a circuit or a device that calculates the location of the smartphone 1 based on the signal output from the GPS antenna 5, and a functional block corresponding to the so-called GPS receiver. Note that the whole smartphone 1 having the GPS receiver unit 10 corresponds to the receiver.

The GPS receiver unit 10 includes an RF receiver circuit part 11 and a baseband processing circuit part 20. Note that the RF receiver circuit part 11 and the baseband processing circuit part 20 may be respectively manufactured as separate LSIs (Large Scale Integrations) or manufactured as one chip.

The RF receiver circuit part 11 is a receiver circuit for RF signal and corresponds to a receiving unit that receives the GPS satellite signal carrying the navigation message. As the circuit configuration of the RF receiver circuit part 11, for example, a receiver circuit that converts the RF signal output from the GPS antenna 5 into a digital signal using an A/D (Analog/Digital) converter and processes the digital signal may be formed. Further, the RF signals output from the GPS antenna 5 may be processed as the analog signal as it is and finally A/D-converted, and the digital signal may be output to the baseband processing circuit part 20.

In the latter case, for example, the RF receiver circuit part 11 may be formed as below, for example. That is, an oscillation signal for RF signal multiplication is generated by frequency dividing or frequency multiplying of a predetermined oscillation signal. Then, the RF signal output from the GPS antenna 5 is multiplied by the generated oscillation signal, and thereby, the RF signal is down-converted to a signal at an intermediate frequency (hereinafter, referred to as "IF (Intermediate Frequency) signal"). Then, the IF signal is amplified, and converted into a digital signal by the A/D converter and output to the baseband processing circuit part 20.

The baseband processing circuit part 20 is a circuit part that acquires and tracks the GPS satellite signals by performing processing operation relating to acquisition and tracking of the GPS satellite signals such as carrier removal and correlation calculation using the digitalized reception data output from the RF receiver circuit part 11.

The baseband processing circuit part 20 decodes the navigation message carried on the GPS satellite signal according to the above described principle. Then, the part estimates the satellite location using the decoded navigation message. Further, the part calculates the pseudo distance using the code phase obtained by the correlation calculation of the received signal and the replica code (signal acquisition), performs known location calculation from the pseudo distance and the satellite location, and thereby, calculates the location of the smartphone 1.

The host processing unit 30 is a processor that generally controls the respective units of the smartphone 1 according to various programs including the system program stored in the memory unit 90, and has a processor such as a CPU (Central Processing Unit) or a DSP (Digital Signal Processor).

The operation unit 40 is an input device having a touch panel, button switches, etc., for example, and outputs signals of pressed down keys and buttons to the host processing unit 30. By the operation of the operation unit 40, various command operations including a call request, a mail sending and receiving request, an internet connection request, a location calculation request, and a location display request are performed.

The display unit 50 is a display device having a LCD (Liquid Crystal Display) etc. and performs various kinds of display based on the display signals output from the host processing unit 30. In the display unit 50, various kinds of information including time information and location information is displayed.

The sound output unit 60 is a sound output device having a speaker or the like, and performs various kinds of sound output based on sound output signals output from the host processing unit 30. From the sound output unit 60, various kinds of sound output including audio guidance is performed.

A mobile phone antenna 65 is an antenna that transmits and receives mobile phone radio signals between a wireless base station placed by a communication service provider of the smartphone 1 and itself.

The communication unit 70 is a communication circuit part of a mobile phone including the RF receiver circuit part and the baseband processing circuit part, and realizes call and transmission and reception of mails by modulation and demodulation of the mobile phone radio signals or the like.

The clock unit 80 is an internal clock of the smartphone 1 and includes a crystal oscillator having a crystal vibrator and an oscillator circuit etc. The clocked time of the clock unit 80 is output to the host processing unit 30 whenever necessary.

The memory unit 90 has a memory device such as a ROM (Read Only Memory), a flash ROM, or a RAM (Random Access Memory), and stores a system program for the host processing unit 30 to control the smartphone 1 and various kinds of programs and data for execution of various kinds of application processing. In the working example, in the memory unit 90, for example, a location display program 91, log data 93, and map data 95 are stored.

The location display program 91 is a program for the host processing unit 30 to allow the display unit 50 to display a current location of the smartphone 1 based on the location information output from the GPS receiver unit 10.

The log data 93 is data in which logs of calculation location etc. are stored and its data configuration example is shown in FIG. 9. In the log data 93, times 931, determination periods No 933, translational movement/non-translational movement determination flags 935, rates of satellites not satisfying allowable condition 937 are stored in correspondence with one another.

The time 931 is a time when translational movement/non-translational movement determination is performed.

The determination period No 933 is a number of the determination period in which translational movement/non-translational movement determination is performed.

The determination flag 935 is a flag indicating a result of translational movement/non-translational movement determination.

As the rate of satellites not satisfying allowable condition 937, a raw value of the rate of satellites not satisfying allowable condition explained in Principle and a filtered value after filter processing on the raw material are stored.

2-2. Circuit Configuration of Baseband Processing Circuit Part

Figure 10:
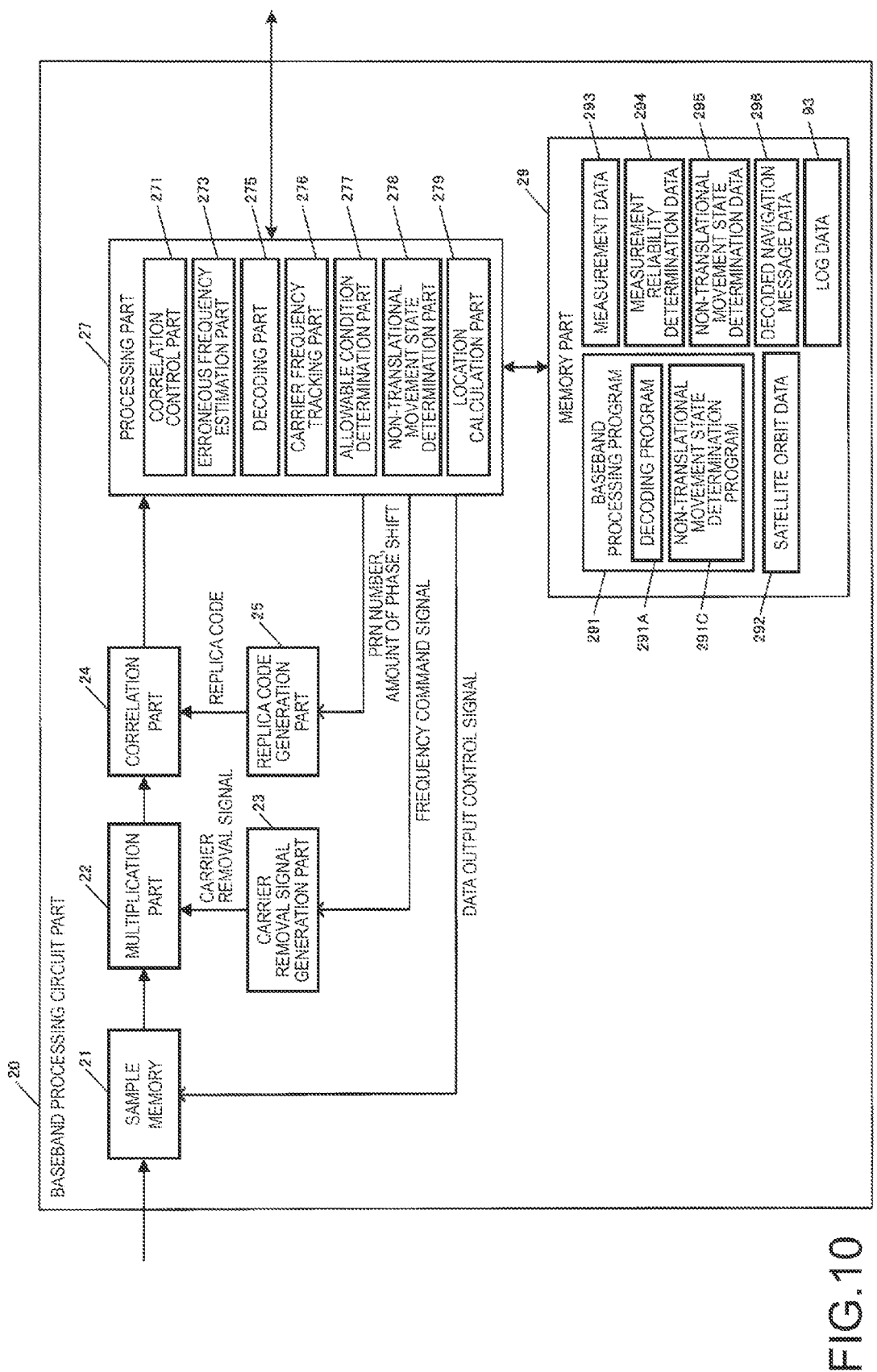
FIG. 10 shows an example of a circuit configuration of a baseband processing circuit part.

FIG. 10 is a block diagram showing a circuit configuration of the baseband processing circuit part 20.

The baseband processing circuit part 20 has a sample memory 21, a multiplication part 22, a carrier removal signal generation part 23, a correlation part 24, a replica code generation part 25, a processing part 27, and a memory part 29.

The sample memory 21 is a memory circuit in which reception data of the digitalized GPS satellite signals output from the RF receiver circuit part 11 is stored. The sample memory 21 may be formed as a ring buffer having an amount of memory that can store data of received signals for three or more unit periods, for example. Obviously, the storage capacity may be more than that.

The multiplication part 22 performs carrier wipe off of removing carrier from the received signal by multiplying the received signal by the carrier removal signal generated by the carrier removal signal generation part 23, and outputs the resulting reception code signal to the correlation part 24. The multiplication part 22 has a multiplier, for example.

The carrier removal signal generation part 23 is a circuit that generates the carrier removal signal as a signal at the same frequency as that of the carrier signal of the GPS satellite signal. When the signal output from the RF receiver circuit part 11 is an IF signal, the part generates a signal at the carrier frequency as the IF frequency. In either case, the part is a circuit for generating the carrier removal signal at the same frequency as that of the signal output from the RF receiver circuit part 11.

The carrier removal signal generation part 23 generates the carrier removal signal at the commanded frequency according to the frequency command signal output from the processing part 27 and outputs the signal to the multiplication part 22. The carrier removal signal generation part 23 respectively outputs an I-phase carrier removal signal as a signal of the in-phase component and a Q-phase carrier removal signal as a signal of the orthogonal component to the multiplication part 22.

The correlation part 24 has a plurality of correlators, for example, and performs correlation calculation of the reception data output from the multiplication part 22 and the replica code generated by the replica code generation part 25.

The replica code generation part 25 is a circuit part that generates replica codes (code replica) of the C/A codes as spread codes of the GPS satellite signals. The replica code generation part 25 generates a replica code of a commanded PRN (Pseudo Random Noise) number with a commanded amount of phase shift according to the PRN number and the amount of phase shift output from the processing part 27, and outputs the code to the correlation part 24.

The processing part 27 is a control device that generally controls the respective functional parts of the baseband processing circuit part 20 and a calculation device, and has a processor such as a CPU or a DSP.

The processing part 27 has a correlation control part 271, an erroneous frequency estimation part 273, a decoding part 275, a carrier frequency tracking part 276, an allowable condition determination part 277, a non-translational movement state determination part 278, and a location calculation part 279 as main functional parts. Note that these functional parts are just described as one working example and not all of the functional parts are necessarily provided as essential component elements. Further, obviously, other functional parts than those may be added as essential component elements.

The correlation control part 271 controls execution of correlation calculation by the correlation part 24.

The erroneous frequency estimation part 273 estimates the erroneous frequency of the predicted frequency using the method explained in Principle by using carry phase of the GPS satellite signal calculated based on the result of the correlation calculation by the correlation part 24.

The decoding part 275 decodes the navigation message carried on the GPS satellite signal using the result of the correlation calculation executed according to the control of the correlation control part 271.

The carrier frequency tracking part 276 tracks the carrier of the received signal. Specifically, the part calculates the frequency difference between the carrier frequency and the frequency of the carrier removal signal generated by the carrier removal signal generation part 23 (hereinafter, referred to as "carrier frequency difference) according to a predetermined frequency discrimination function.

The allowable condition determination part 277 determines whether or not the erroneous frequency estimated by the erroneous frequency estimation part 273 satisfies a predetermined allowable condition.

The non-translational movement state determination part 278 determines whether or not the smartphone 1 is in the non-translational movement state in which the smartphone moves while changing its location relative to the body of the user using the determination result of the allowable condition determination part 277.

The location calculation part 279 calculates the location (location coordinates) and the time error (clock bias) of the smartphone 1 by performing known location calculation in related art using the pseudo distance, for example, using the navigation message decoded by the decoding part 275. Then, the part outputs the calculation result to the host processing unit 30.

The memory part 29 stores the system program of the baseband processing circuit part 20, various kinds of programs and data for realization of various functions including the satellite signal acquisition and tracking function, the decoding function, the non-translational movement state determination function, and the location calculation function. Further, the part has a work area that temporarily stores data in processing and processing results of various kinds of processing.

In the memory part 29, as a program, a baseband processing program 291 read out by the processing part 27 and executed as baseband processing (see FIG. 12) is stored. The baseband processing program 291 includes a decoding program 291A executed as decoding processing (see FIG. 13) and a non-translational movement state determination program 291C executed as non-translational movement state determination processing (see FIG. 14) as subroutines.

Further, in the memory part 29, as main data, satellite orbit data 292, measurement data 293, measurement reliability determination data 294, non-translational movement state determination data 295, decoded navigation message data 296, and the log data 93 are stored.

The satellite orbit data 292 includes data of Almanac, Ephemeris of the respective GPS satellites, or the like. The satellite orbit data 292 acquires the GPS satellite signals received from the GPS satellites by decoding or as assist data from a base station of the smartphone 1 or an assist server, for example.

The measurement data 293 is data in which measurement information acquired based on the result of the correlation calculation is stored. For example, the data is various quantities relating to the received GPS satellite signals including code phase and Doppler frequencies.

The measurement reliability determination data 294 is data used for determination of measurement reliability. For example, the data includes information such as signal intensity of received GPS signals and elevation angles of the respective GPS satellites.

The non-translational movement state determination data 295 is data used for non-translational movement state determination, and FIG. 11 shows its data configuration example. The non-translational movement state determination data 295 is data defined with respect to each acquisition satellite and an acquisition satellite No 2951 showing the number of the acquisition satellite is stored in each non-translational movement state determination data 295. Further, in each non-translational movement state determination data 295, a determination period No 2952, a unit period No 2953, an erroneous frequency 2954, a beyond allowable range flag 2955, a counter value 2956, and measurement reliability 2957 are stored in correspondence with one another.

The determination period No 2952 is a number of the period in which translational movement/non-translational movement determination is performed.

The unit period No 2953 is a number of the unit period contained in the determination period. For example, when the determination period is set to a period of one second and the unit period is set to a period of 20 milliseconds, one determination period includes fifty unit periods from one to fifty.

The erroneous frequency 2954 is an erroneous frequency calculated with respect to the unit period, and the value of the erroneous frequency Δf estimated by the erroneous frequency estimation part 273 according to the above described principle is stored therein.

The beyond allowable range flag 2955 is a flag for which ON is set when the erroneous frequency 2954 calculated with respect to the unit period is beyond the allowable range and OFF is set when the frequency is within the allowable range, and is set based on the determination result of the allowable condition determination part 277.

The counter value 2956 is the number of times when the erroneous frequency 2954 is determined to be beyond the allowable range with respect to the determination period, and is obtained as a total value of the number of times when the beyond allowable range flag 2955 is ON.

The measurement reliability 2957 is measurement reliability acquired in the determination period and divided into five stages of "1 to 5", for example. In the working example, the explanation will be made suppose that the smaller the numeric value, the higher the reliability of the measurement information is. That is, the measurement reliability "1" indicates the highest reliability of the measurement information and the measurement reliability "5" indicates the lowest reliability of the measurement information. Obviously, the definition of the measurement reliability is not limited to that.

The decoded navigation message data 296 is data in which the navigation message decoded by the decoding part 275 according to the above described principle is stored.

2-3. Flow of Processing

Figure 12:
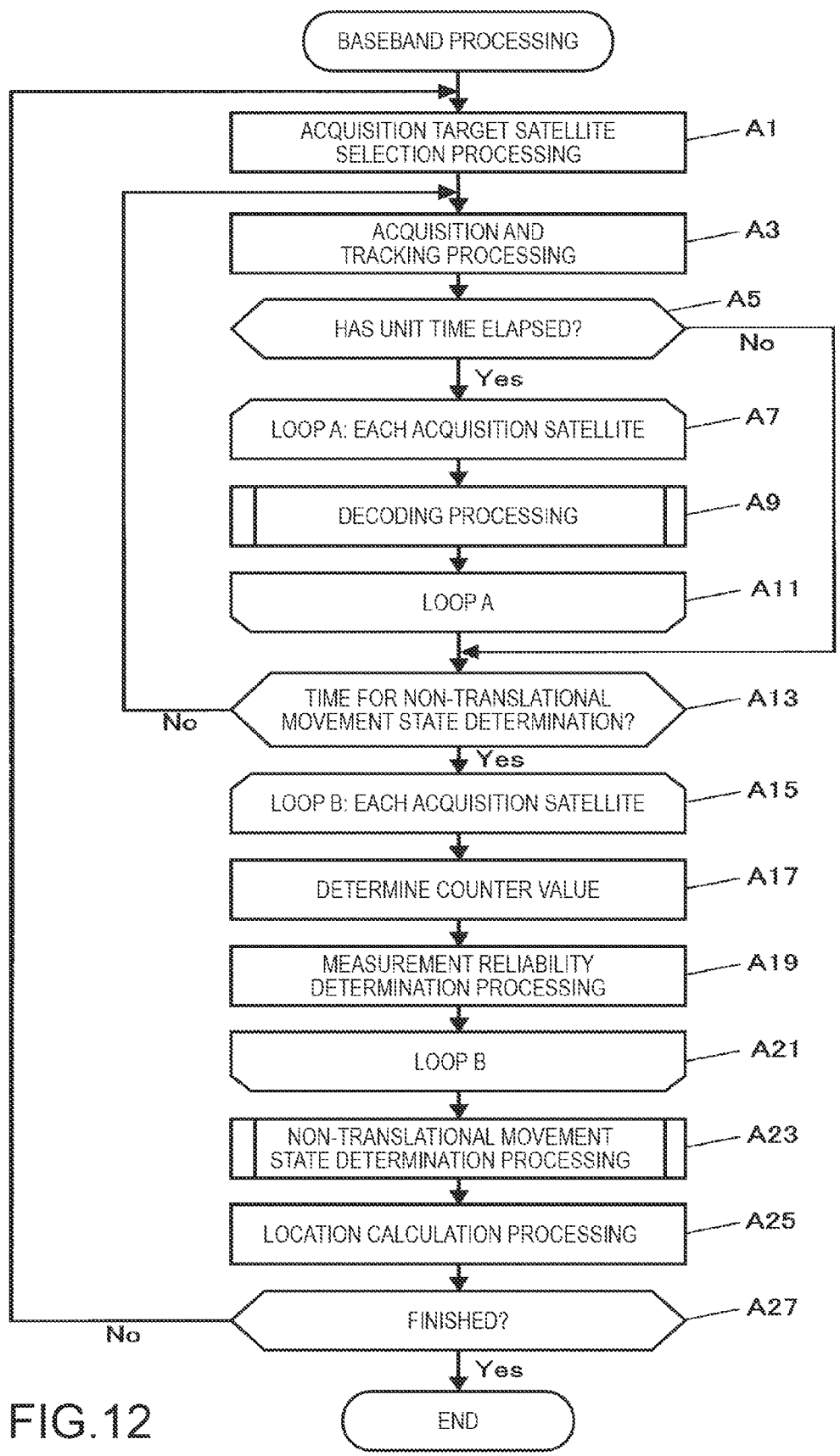
FIG. 12 is a flowchart showing a flow of baseband processing.

FIG. 12 is a flowchart showing a flow of the baseband processing executed by the processing part 27 according to the baseband processing program 291 stored in the memory part 29.

First, the processing part 27 performs acquisition target satellite selection processing (step A1). Specifically, the part determines the GPS satellites located in the sky at the current time clocked by the clock part 80 using the satellite orbit data 292 stored in the memory part 29 and selects them as the acquisition target satellites.

Then, the processing part 27 performs acquisition and tracking processing of acquiring and tracking the acquisition target satellites selected at step A1 (step A3). Then, the processing part 27 determines whether or not the unit time has elapsed (step A5), and if the part determines that the unit time has not elapsed (step A5; No), the part moves to step A13.

On the other hand, if the part determines that the unit time has elapsed (step A5; Yes), the processing part 27 executes the processing of loop A with respect to each acquisition satellite (steps A7 to A11). In the processing of the loop A, the processing part 27 performs decoding processing according to the decoding program 291A stored in the memory part 29 (step A9).

Figure 13:
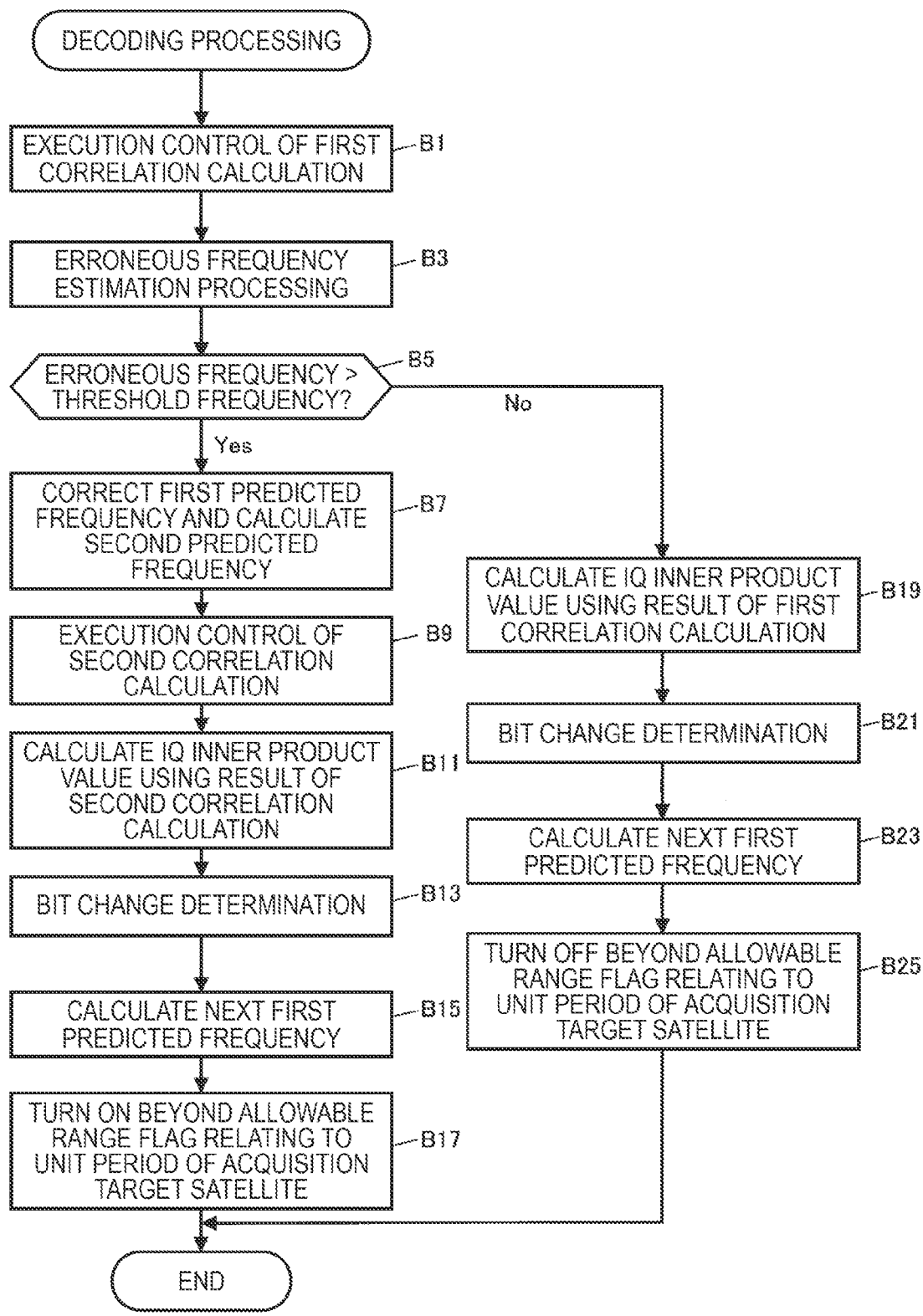
FIG. 13 is a flowchart showing a flow of decoding processing.

FIG. 13 is a flowchart showing a flow of the decoding processing.

First, the correlation control part 271 controls execution of first correlation calculation by the correlation part 24 (step B1). Specifically, the part outputs an output control signal of data to the sample memory 21 and controls the memory to output reception data relating to the last unit period. Further, the part outputs a frequency command signal for generation of a carrier removal signal of a first predicted frequency calculated at step B15 or step B23 in the previous decoding processing to the carrier removal signal generation part 23. Furthermore, the part outputs the PRN number relating to the acquisition satellite and an amount of phase shift of the replica code to the replica code generation part 25. Thereby, the reception data is output from the sample memory 21, the carrier wipe off is executed in the multiplication part 22, and the first correlation calculation is executed in the correlation part 24.

Then, the erroneous frequency estimation part 273 performs erroneous frequency estimation processing of estimating the erroneous frequency of the predicted frequency according to the above described principle (step B3). Then, the allowable condition determination part 277 determines the allowable condition as to whether or not the erroneous frequency estimated in the erroneous frequency estimation processing exceeds a predetermined threshold frequency (e.g., 3 Hz) (step B5).

If the part determines that the erroneous frequency exceeds the predetermined threshold frequency, i.e., the erroneous frequency does not satisfy the allowable condition (step B5; Yes), the processing part 27 corrects the first predicted frequency using the erroneous frequency to calculate a second predicted frequency (step B7). That is, the part adds the erroneous frequency to the first predicted frequency to obtain the second predicted frequency.

Then, the correlation control part 271 controls execution of second correlation calculation by the correlation part 24 (step B9). Specifically, the part outputs an output control signal of data to the sample memory 21 and controls the memory to output the same reception data as that at step B1 (reception data relating to the last unit period). Further, the part outputs a frequency command signal for generation of a carrier removal signal of the second predicted frequency calculated at step B7 to the carrier removal signal generation part 23, and outputs the PRN number relating to the acquisition satellite and an amount of phase shift of the replica code to the replica code generation part 25. Thereby, the same reception data is output from the sample memory 21, the carrier wipe off is executed in the multiplication part 22, and the second correlation calculation is executed in the correlation part 24.

Then, the decoding part 275 calculates an IQ inner product value using the result of the second correlation calculation (step B11). Specifically, the part calculates correlation integrated values (I-phase correlation integrated value and Q-phase correlation integrated value) by integration of correlation values obtained in the second correlation calculation at step B9 for the unit period. Then, the part calculates the IQ inner product value according to the equation (1) using the calculated correlation integrated values and the previously calculated correlation integrated values.

Then, the decoding part 275 determines whether or not the bit changes based on the positive and negative sign of the IQ inner product value calculated at step B11 (step B13). That is, the part determines whether or not the bit value changes at the boundary between the last unit period and the unit period previous to the unit period. Then, the part determines the bit value of the navigation message based on the determination result, and stores the bit value in the decoded navigation message data 296 of the memory part 29.

Then, the carrier frequency tracking part 276 calculates the next first predicted frequency used for the first correlation calculation with respect to the next reception data relating to the next unit period using the second predicted frequency (step B15). That is, the part linearly predicts the first predicted frequency relating to the next unit period, for example, using the predicted frequency (the first predicted frequency or the second predicted frequency) calculated in the past and the second predicted frequency calculated at step B7.

Then, the processing part 27 turns ON the beyond allowable range flag 2955 relating to the unit period of the acquisition satellite, and updates the non-translational movement state determination data 295 relating to the acquisition satellite of the memory part 29 (step B17). Then, the processing part 27 ends the decoding processing.

On the other hand, if the part determines that the erroneous frequency does not satisfy the allowable condition (step B5; No), the decoding part 275 calculates an IQ inner product value using the result of the first correlation calculation (step B19). Specifically, the part calculates the IQ inner product value according to the equation (1) using the correlation integrated values calculated at step B1 and the previously calculated correlation integrated values.

Then, the decoding part 275 determines whether or not the bit changes based on the positive or negative sign of the IQ inner product value calculated at step B19 (step B21). That is, the part determines whether or not the bit value changes at the boundary between the last unit period and the unit period previous to the unit period. Then, the part determines the bit value of the navigation message based on the determination result, and stores the bit value in the decoded navigation message data 296 of the memory part 29.

Then, the carrier frequency tracking part 276 calculates the next first predicted frequency used for the first correlation calculation with respect to the next reception data relating to the next unit period using the first predicted frequency (step B23). That is, the part linearly predicts the first predicted frequency relating to the next unit period, for example, using the predicted frequency (the first predicted frequency or the second predicted frequency) calculated in the past and the first predicted frequency calculated at this time.

Then, the processing part 27 turns OFF the beyond allowable range flag 2955 relating to the unit period of the acquisition satellite, and updates the non-translational movement state determination data 295 relating to the acquisition satellite of the memory part 29 (step B25). Then, the processing part 27 ends the decoding processing.

Returning to the baseband processing in FIG. 12, after the decoding processing, the processing part 27 shifts the processing to the next acquisition satellite. After the decoding processing with respect to all acquisition satellites, the processing part 27 ends the processing of the loop A (step A11).

Then, the processing part 27 determines whether the time is the non-translational movement state determination time (step A13) and, if the part determines that the time is not the non-translational movement state determination time (step A13; No), the part returns to step A3. On the other hand, if the part determines that the time is the non-translational movement state determination time (step A13; Yes), the part performs processing of loop B with respect to each acquisition satellite (steps A15 to A21).

In the processing of the loop B, the processing part 27 determines the counter value 2956 in the determination period based on the beyond allowable range flag 2955 stored in the non-translational movement state determination data 295 relating to the acquisition satellite (step A17). Then, the processing part 27 performs measurement reliability determination processing of determining the measurement reliability 2957 based on the measurement reliability determination data 294 stored in the memory part 29 (step A19).

After the processing at steps A17 and A19 with respect to all acquisition satellites, the processing part 27 ends the processing of the loop B (step A21). Then, the processing part 27 performs non-translational movement state determination processing according to the non-translational movement state determination program 291C stored in the memory part 29 (step A23).

Figure 14:
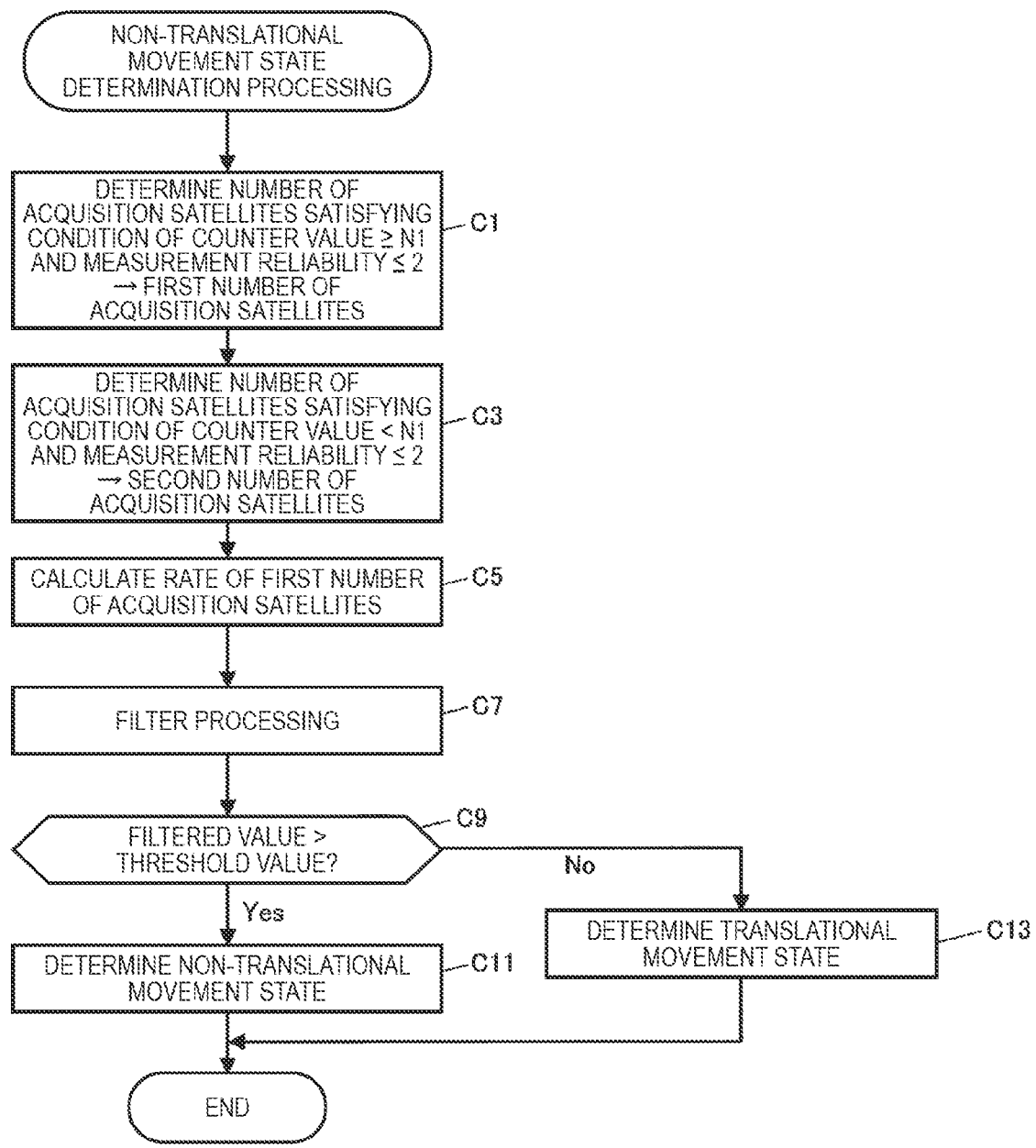
FIG. 14 is a flowchart showing a flow of non-translational movement state determination processing.

FIG. 14 is a flowchart showing a flow of the non-translational movement state determination processing.

The non-translational movement state determination part 278 determines the number of acquisition satellites that satisfies a condition (first condition) of "counter value≥N1 and measurement reliability≤2", and uses it as a first number of acquisition satellites (step C1). Further, the non-translational movement state determination part 278 determines the number of acquisition satellites that satisfies a condition (second condition) of "counter value<N1 and measurement reliability≤2", and uses it as a second number of acquisition satellites (step C3).

Then, the non-translational movement state determination part 278 calculates a rate of the first number of acquisition satellites to the sum value of the first number of acquisition satellites and the second number of acquisition satellites, and stores it as a rate of satellites not satisfying allowable condition in the log data 93 of the memory part 29 (step C5).

Then, the non-translational movement state determination part 278 executes filter processing with respect to the rate of satellites not satisfying allowable condition (index value) calculated at step C5 (step C7). As the filter processing executed here, for example, low-pass filter processing may be applied as has been explained in Principle.

The non-translational movement state determination part 278 determines whether or not the filtered value after the filter processing exceeds a predetermined threshold value (step C9) and, if the value exceeds the threshold value (step C9; Yes), the part determines the movement state of the electronic apparatus as the non-translational movement state (step C11), and the part stores the determination result in the determination flag 935 of the log data 93 of the memory part 29. On the other hand, if the filtered value is equal to or less than the threshold value (step C9; No), the part determines the movement state of the electronic apparatus as the translational movement state (step C13), and the part stores the determination result in the determination flag 935 of the log data 93 of the memory part 29. After these steps, the non-translational movement state determination part 278 ends the non-translational movement state determination processing.

Returning to the baseband processing in FIG. 12, after the non-translational movement state determination processing, the location calculation part 279 performs location calculation processing (step A25). Specifically, the part calculates the location and the clock error of the smartphone 1 by performing the known location calculation in related art to which the least-square method or an algorithm of Kalman filter is applied, for example, using the measurement information stored in the measurement data 293 of the memory part 29 and the navigation message stored in the decoded navigation message data 296. Then, the part stores the calculation results in the log data 93 of the memory part 29.

Then, the processing part 27 determines whether or not to end the processing (step A27). If the part determines to still continue the processing (step A27; No), the part returns to step A1. If the part determines to end the processing (step A27; Yes), the processing part 27 ends the baseband processing.

The host processing unit 30 acquires the log data 93 from the memory part 29 of the baseband processing circuit part 20. Then, the host processing unit 30 performs control of allowing the display unit 50 to display the location according to the location display program 91 stored in the memory unit 90. Specifically, a location calculation control part 31 calculates the location by changing the method of location calculation according to the translational movement/non-translational movement determination flag 935 stored in the log data 93. Then, a location display control part 33 allows the display unit 50 to display the location calculated by the location calculation control part 31.

Specifically, the location calculation control part determines whether the translational movement/non-translational movement determination flag 935 indicates translational movement or non-translational movement with reference to the log data 93. Then, if the determination flag 935 indicates "non-translational movement", the part determines that the calculated location calculated by the GPS receiver unit 10 is the display location. On the other hand, if the determination flag indicates "translational movement", the part performs map matching processing using the map data 95 with respect to the calculated location acquired from the GPS receiver unit 10. Then, the part determines the location obtained as a result of the map matching processing (hereinafter, referred to as "map matching result location") as the display location. The location display control part 33 generates a display screen in which the output location determined by the location calculation control part 31 is plotted and displays it on the display unit 50.

Figure 15:
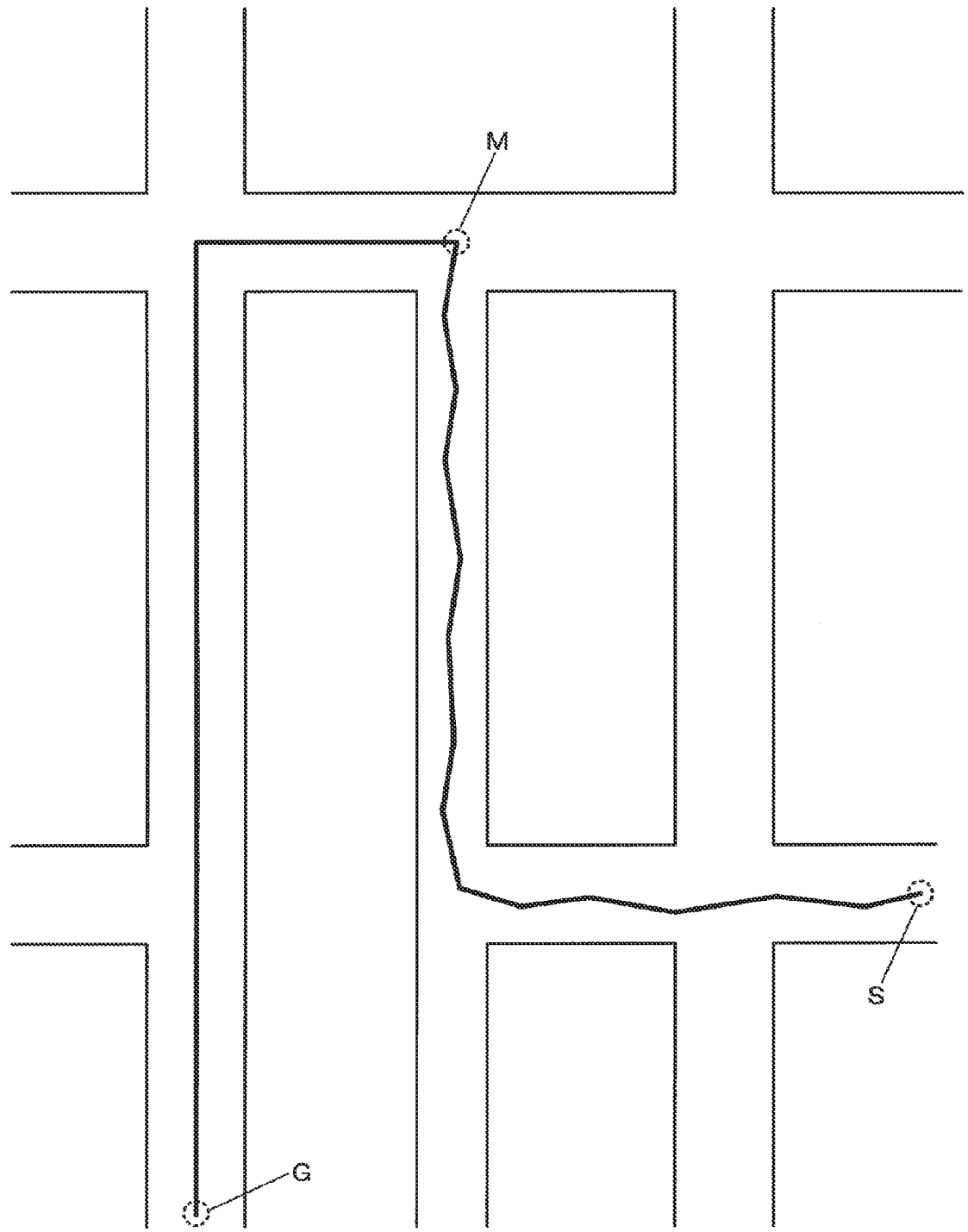
FIG. 15 shows an example of a display screen of the smartphone.

FIG. 15 shows an example of a display screen displayed in the display unit 50 of the smartphone 1 in this case, when the user carrying the smartphone 1 moves from a starting point S to a goal point G. The user walks with the smartphone 1 in hand from the start point S to a middle point M. Accordingly, the movement state of the smartphone 1 is determined as "non-translational movement" from the start point S to the middle point M. In this case, the calculated location by the GPS receiver unit 10 is displayed on the display screen as described above. Accordingly, a slightly meandering trajectory is drawn as the trajectory of the calculated location from the start point S to the middle point M.

Suppose that the user rides on an automobile (e.g., a taxi) at the middle point M. In this case, the smartphone 1 no longer non-translationally moves with swinging of the arm of the user, and the movement state of the smartphone 1 is determined as "translational movement". In this case, as described above, the control to display the map matching result location as the output location on the display screen is performed. Accordingly, a linear location trajectory as the map matching result is drawn from the middle point M to the goal point G.

2-4. Advantages

In the smartphone 1 that is carried by a user, receives GPS satellite signals, and calculates a location, the correlation part 24 performs correlation calculation based on a given predicted frequency with respect to received GPS satellite signal. Then, the erroneous frequency estimation part 273 estimates an erroneous frequency of the predicted frequency using carrier phase of the GPS satellite signal based on a result of the correlation calculation of the correlation part 24. The allowable condition determination part 277 determines whether or not the erroneous frequency estimated by the erroneous frequency estimation part 273 satisfies a predetermined allowable condition. The non-translational movement state determination part 278 determines whether or not the smartphone 1 is in the non-translational movement state in which the smartphone moves while changing its location relative to the body of the user using a result of the determination of the allowable condition determination part 277. Then, the location calculation control part 31 changes a method of controlling location calculation if the smartphone is determined to be in the non-translational movement state by the non-translational movement state determination part 278.

The state that the erroneous frequency does not satisfy the allowable condition means that there is a large divergence between the Doppler frequency predicted in the GPS receiver unit 10 and the real Doppler frequency. Further, when the state that the erroneous frequency does not satisfy the allowable condition continues, it may be considered to be highly likely that the user moves while swinging the arm with the smartphone 1 in hand. Accordingly, whether or not the smartphone 1 is in the non-translational movement state may be appropriately determined using the determination result as to whether or not the erroneous frequency satisfies the allowable condition. In the working example, there is an advantage that the movement state, particularly, the non-translational movement state of the smartphone 1 may be determined by the GPS itself.

As the determination method in this case, for example, whether or not the smartphone is in the non-translational movement state may be determined based on an index value of one of the number of times of occurrence, the frequency of occurrence, and the rate of occurrence of determination that the erroneous frequency does not satisfy the allowable condition. In the working example, estimation of the erroneous frequency is performed at each time when a unit period of the time corresponding to the bit length of the navigation message elapses, and whether or not the erroneous frequency satisfies the allowable condition. Then, at the time when a determination period longer than the unit period elapses, the number of times of occurrence of determination that the erroneous frequency does not satisfy the allowable condition is counted based on the determination results with respect to each unit period contained in the determination period. Then, whether or not the smartphone 1 is in the non-translational movement state is determined depending on whether or not the number of times of occurrence exceeds a predetermined threshold number of times. Thereby, whether or not the smartphone 1 is in the non-translational movement state may be appropriately determined.

Further, in the working example, among a plurality of acquisition signals, regarding the determination result as to whether or not the erroneous frequency satisfies the allowable condition, a rate of the acquisition satellites having the number of times of occurrence of determination not to satisfy the allowable condition that satisfies a predetermined high threshold condition and having measurement reliability that satisfies a high reliability condition is calculated. Then, low-pass filter processing is performed as filter processing of removing unexpected values with respect to the calculated rate, threshold determination with respect to the index value after the low-pass filter processing is performed, and whether or not the smartphone 1 is in the non-translational movement state is determined. Depending on the reception status and the reception environment of the GPS satellite signals, unexpected values may be calculated as the index value used for non-translational movement state determination. However, for example, whether or not the smartphone is in the non-translational movement state is determined based on the index value after low-pass filter processing, and thereby, reduction of the determination accuracy of the non-translational movement state may be prevented. The method has an advantage that non-translational movement state determination can be performed with high accuracy even in the weak field environment, the multipath environment, or the like.

3. Modified Examples

The working example to which the invention may be applied is not limited to the above described working example, but changes may be appropriately made without departing from the scope of the invention. As below, modified examples will be explained. Note that the same configurations as those of the embodiment have the same signs and repeated explanation will be omitted.

3-1. Electronic Apparatus

In the working example, the case where the invention is applied to the smartphone as a kind of an electronic apparatus has been explained as an example, however, the electronic apparatus to which the invention may be applied is not limited to that. For example, the invention may be similarly applied to other electronic apparatus including a portable navigation system, a notebook personal computer, a PDA (Personal Digital Assistant), a wristwatch, and a runners watch.

For example, the case where the invention is applied to a runners watch as a kind of an electronic apparatus will be explained as an example. The non-translational movement state of the user wearing a runners watch on the arm is determined according to the same method as that of the embodiment. Further, information including the location and the traveling distance of the user is stored as log data with the determination result of translational movement/non-translational movement.

The stored log data may be used for the user to check and edit information including the traveling distance and traveling route afterward. That is, after finishing running or marathon, the user detaches the runners watch and connects it to an external device such as a personal computer, and performs checking and editing on the display screen. In this case, with respect to the section determined to be in the non-translational movement state, the user is considered to continuously travel, and, with respect to the section determined to be in the translational movement state, the user is highly likely to move on a vehicle or the like. Accordingly, for example, processing of not adding the traveling distance of the section determined to be in the translational movement state to the cumulative traveling distance, but adding only the traveling distance of the section determined to be in the non-translational movement state to the cumulative traveling distance may be performed.

3-2. Control at Determination of Non-Translational Movement State

As control when an electronic apparatus is determined to be in the non-translational movement state, the method of controlling the location calculation may be changed or the display control may be changed.

When the method of controlling the location calculation is changed, as has been explained in the working example, control of switching ON/OFF of map matching processing may be performed based on the determination result of the movement state. As has been explained in the working example, for example, the case of an electronic apparatus with which the user moves in hand is considered, if the determination result is the non-translational movement state, the user walks or runs, and, if the determination result is the translational movement state, the user may move on a vehicle. Accordingly, if the determination result is the non-translational movement state, the map matching function may be turned OFF and, if the determination result is the translational movement state, the map matching function may be turned ON.

Further, stop determination may be performed based on the result of location calculation. For example, the distance between the calculated location at this time and the calculated location at the previous time is calculated and, if the calculated distance is equal to or more than (over) a predetermined threshold value, the apparatus may be determined to be moving and, if the calculated distance is less than (or equal to or less than) the predetermined threshold value, the apparatus may be determined to be stopped. The determination result of the non-translational movement state of the embodiment may be reflected on the stop determination processing.

Specifically, if the non-translational movement state is determined, the user is highly likely to be walking or running, and the movement distance of the user tends to be shorter compared to that in the case where the user is moving on a vehicle. Accordingly, if the non-translational movement state is determined, the threshold distance used for stop determination processing may be set to be shorter compared to that in the case where the translational movement state is determined.

Further, when the method of display control is changed, for example, the operation may be performed in the following manner. If the determination result is the non-translational movement state, the user is highly likely to walk or run while swinging the arm with an electronic apparatus in hand. Therefore, it is considered to be unlikely that the user visually recognizes the display screen of the electronic apparatus. Accordingly, the control is performed so that the calculated location may be displayed on the display screen in a general display mode (simplified display mode) or in a power-saving mode in which the display brightness is set to be lower. In contrast, if the determination result is the translational movement state, the user is highly likely to move on a vehicle and the user may visually recognize the display screen of the electronic apparatus, and thus, for example, the control is performed so that the calculated location may be displayed on the display screen in the normal display mode (detailed display mode) or with the display brightness as normal brightness.

3-3. Non-Translational Movement State Determination Method

The non-translational movement state determination processing should not necessarily be executed according to the processing flow explained with reference to FIG. 14, but obviously, may be appropriately changed in setting. For example, satellites used for non-translational movement state determination may be selected among a plurality of satellites and whether or not an electronic apparatus is in the non-translational movement state using the determination result of the allowable condition relating to the selected satellites.

Figure 16:
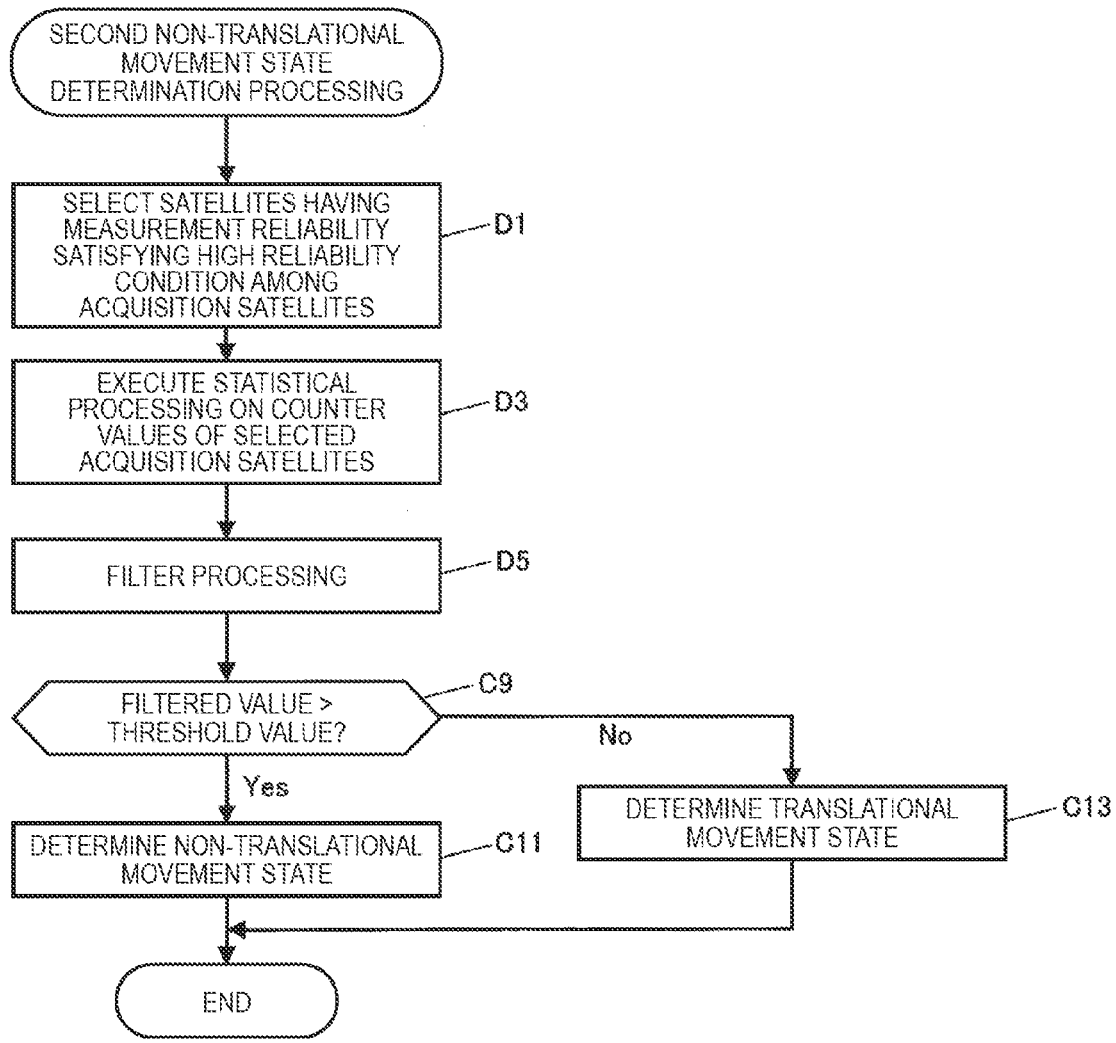
FIG. 16 is a flowchart showing a flow of second non-translational movement state determination processing.

FIG. 16 is a flowchart showing a flow of second non-translational movement state determination processing executed by the processing part 27 of the above described working example in place of the non-translational movement state determination processing in FIG. 14 in this case.

The non-translational movement state determination part 278 selects acquisition satellites having measurement reliability that satisfies a predetermined high reliability condition among acquisition satellites (step D1). For example, the part selects the acquisition satellites having measurement reliability equal to or lower than "2" among the acquisition satellites.

Then, the non-translational movement state determination part 278 executes predetermined statistical processing with respect to the counter values of the selected acquisition satellites (step D3). As the statistical processing in this case, various methods may be applied. As the simplest processing, averaging processing of calculating an average value of the counter values relating to all of the selected acquisition satellites may be applied. In place of calculation of the average value, processing of selecting a median value or a mode value may be performed.

Then, the non-translational movement state determination part 278 performs filter processing of removing unexpected values with respect to temporal change of the value obtained by the statistical processing (step D5). Then, the non-translational movement state determination part 278 shifts to step C9. The subsequent processing is the same as the non-translational movement state determination processing in FIG. 14.
3-4. Index Value The index value when determination as to whether or not the state is the non-translational movement state is made may be one of the number of times of occurrence, the frequency of occurrence, and the rate of occurrence of the determination that the erroneous frequency does not satisfy the allowable condition. Obviously, any of the index values may be used. The non-translational movement state determination may be performed with respect to at least one acquisition satellite using at least one index value of the number of times of occurrence, the frequency of occurrence, and the rate of occurrence. In the case where the frequency of occurrence is used, for example, with respect to a certain acquisition satellite, the rate of single occurrence of the determination that the erroneous frequency does not satisfy the allowable condition may be determined within a predetermined period. Further, in the case where the rate of occurrence is used, the rate of the determination that the erroneous frequency does not satisfy the allowable condition within a predetermined period may be determined.

Further, in the above described working example, the processing in the case where whether or not the electronic apparatus is in the non-translational movement state is determined using the rate of the satellites for which the determination results as to whether or not the erroneous frequency satisfies the allowable condition do not satisfy the allowable condition among the plurality of satellites as the index value has been exemplified. However, whether or not the electronic apparatus is in the non-translational movement state may be determined using at least one of the number, the frequency, and the rate of satellites that do not satisfy the allowable condition as the index value.

In these cases, generation of unexpected values in the index value is considered as described above. It is effective that, when any one the index values is used, the filter processing of removing the unexpected values of the index value is performed with respect to the temporal change of the index value, and whether or not the state is in the non-transitional movement state is determined using the result of the filter processing.
3-5. Filter Processing In the above described embodiment, the case where the low-pass filter processing is performed as the filter processing with respect to the temporal change of the index value has been explained, however, the filter processing is not limited to that. For example, an allowable range in which variations of the index value are allowed is determined, and processing of clipping the index value beyond the allowable range may be performed as the filter processing.

Further, in consideration of the generation of unexpected values, it is effective that the filter processing is performed with respect to the temporal change of the index value. However, the filter processing should not necessarily be executed and, obviously, the filter processing may be omitted.
3-6. Frequency Tracking In the above described working example, the case where the processing part 27 of the baseband processing circuit part 20 performs carrier frequency tracking processing has been explained, however, a loop circuit for carrier frequency tracking may be formed by an electronic circuit, and the carrier frequency tracking may be performed by the loop circuit.

Specifically, an integration part that integrates the correlation values is provided at the downstream of the correlation part 24 and the output of the integration part is feedback-input to the loop circuit. The loop circuit includes a frequency discriminator and a loop filter, for example, so that the output of the loop filter may be output to the carrier removal signal generation part 23. In this case, the processing part 27 may perform the same processing as the above described decoding processing using the frequency output from the loop filter as the first predicted frequency.
3-7. Reference Phase In the above described embodiment, the carrier phase obtained from the correlation integrated values (I-phase correlation value and Q-phase correlation value) obtained with respect to the previous unit period has been used as the reference phase. That is, the explanation has been made suppose that the reference phase is determined using the carrier phase based on the result of the second correlation calculation performed with respect to the reception data relating to the last unit period. However, the method of determining the reference phase is not limited to that. For example, the carrier phase obtained by averaging processing of the carrier phase obtained from the correlation integrated values relating to the unit periods for a predetermined period in the past (e.g., two unit periods in the past) may be determined as the reference phase.
3-8. Index Value for Bit Change Determination In the above described embodiment, the explanation has been made by taking the IQ inner product value (Dot value) as an example of the index value for determination as to whether or not the bit value of the navigation message changes, however, the index value is not limited to that. The case where whether or not the bit value changes in the navigation message is determined using an index value referred to as "power value" as another index value than the IQ inner product value will be explained as below.

The correlation integrated values of the adjacent unit periods are summed with different combinations of addition or subtraction, and the power value is calculated using the summation result. Specifically, the power values are calculated according to two types of combinations (summation method) of a first combination "(positive,positive)" as the summation method in which the correlation integrated value relating to the nth unit period is set to be "positive" and the correlation integrated value relating to the (n+1)th unit period is set to be "positive" and a second combination "(positive,negative)" as the summation method in which the correlation integrated value relating to the first unit period is set to be "positive" and the correlation integrated value relating to the second unit period is set to be "negative".

The power value calculated according to the first combination "(positive,positive)" is referred to as "addition power value" and shown by "Power$^+$". Further, the power value calculated according to the second combination "(positive, negative)" is referred to as "subtraction power value" and shown by "Power$^-$". For example, the addition power value and the subtraction power value calculated using the correlation integrated value relating to the nth unit period and the correlation integrated value relating to the (n+1)th unit period are shown by "Power$^+$(n|n+1)" and "Power$^-$(n|n+1)", respectively.

The addition power value Power$^+$(n|n+1) and the subtraction power value Power$^-$(n|n+1) are calculated according to the following equations (2) and (3), respectively.

$$\text{Power}^+(n|n+1)=\{PSumI(n)+PSumI(n+1)\}^2+ \{\{PSumQ(n)+PSumQ(n+1)\}^2 \quad (2)$$

$$\text{Power}^-(n|n+1)=\{PSumI(n)-PSumI(n+1)\}^2+ \{\{PSumQ(n)-PSumQ(n+1)\}^2 \quad (3)$$

Then, the magnitude of the addition power value and the magnitude of the subtraction power value are compared. Then, if the addition power value Power$^+$(n|n+1) is larger than the subtraction power value Power$^-$(n|n+1)(Power$^+$(n|n+1)>Power$^-$(n|n+1)), the determination that the bit value of the navigation message data has not changed at the boundary between the nth unit period and the (n+1)th unit period is made (bit unchanged). In the opposite case (Power$^-$(n|n+1)>Power$^+$(n|n+1)), the determination that the bit value of the navigation message has changed at the boundary between the nth unit period and the (n+1)th unit period is made (bit changed).

3-9. Subject of Processing

In the above described embodiment, the explanation that the non-translational movement state determination is executed by the processing part 27 of the baseband processing circuit part 20 has been made, however, this may be executed by the host processing unit 30 of the electronic apparatus. Further, the processing may be distributed by the processor of the baseband processing circuit part and the processor of the electronic apparatus so that the non-translational movement state determination may be executed by the processing part 27 and the location calculation may be executed by the host processing unit 30.

3-10. Satellite Positioning System

Further, in the above described embodiment, the explanation has been made by taking GPS as an example of the satellite positioning system, however, another satellite positioning system such as WAAS (Wide Area Augmentation System), QZSS (Quasi Zenith Satellite System), GLONASS (GLObal Navigation Satellite System), or GALILEO may be employed.

What is claimed is:

1. A method of controlling an electronic apparatus that is carried by a user, receives a positioning signal, and calculates a location, comprising:
    performing correlation calculation on the received positioning signal based on a given predicted frequency;
    estimating an erroneous frequency of the predicted frequency using carrier phase of the positioning signal based on a result of the correlation calculation;
    determining whether or not the erroneous frequency satisfies a predetermined allowable condition;
    determining whether or not the electronic apparatus is in a non-translational movement state in which the electronic apparatus moves while changing the location thereof relative to a body of the user using a result of the determination; and
    changing a method of controlling location calculation or changing display control if the electronic apparatus is determined to be in the non-translational movement state.

2. The method according to claim 1, wherein the determination as to whether or not the electronic apparatus is in the non-translational movement state is to determine whether or not the electronic apparatus is in the non-translational movement state based on at least one index value of a number of times of occurrence, a frequency of occurrence, and a rate of occurrence of determination that the erroneous frequency does not satisfy the allowable condition.

3. The method according to claim 2, wherein the determination as to whether or not the electronic apparatus is in the non-translational movement state includes:
    performing filter processing of removing an unexpected value of the index value based on temporal change of the index value; and
    determining whether or not the electronic apparatus is in the non-translational movement state based on the filter-processed index value.

4. The method according to claim 1, wherein the positioning signal is a signal from each of a plurality of satellites,
    further comprising selecting a satellite used for the non-translational movement state determination among the plurality of satellites,
    wherein the determination as to whether or not the electronic apparatus is in the non-translational movement state includes determining whether or not the electronic apparatus is in the non-translational movement state using a determination result as to whether or not the erroneous frequency relating to the selected satellite satisfies the allowable condition.

5. The method according to claim 1, wherein the positioning signal is a signal from each of a plurality of satellites, and
    the determination as to whether or not the electronic apparatus is in the non-translational movement state is to determine whether or not the electronic apparatus is in the non-translational movement state based on at least one index value of a number, a frequency, and a rate of satellites for which the determination results do not satisfy the allowable condition among the plurality of satellites.

6. An electronic apparatus that is carried by a user, receives a positioning signal, and calculates a location, comprising:
    a correlation unit that performs correlation calculation on the received positioning signal based on a given predicted frequency;
    an estimation unit that estimates an erroneous frequency of the predicted frequency using carrier phase of the positioning signal based on a result of the correlation calculation;
    a determination unit that determines whether or not the erroneous frequency satisfies a predetermined allowable condition;
    a non-translational movement state determination unit that determines whether or not the electronic apparatus is in a non-translational movement state in which the electronic apparatus moves while changing the location thereof relative to a body of the user using the determination results; and
    a control changing unit that changes a method of controlling location calculation or changes display control if positive determination is made by the non-translational movement state determination unit.

* * * * *